(12) United States Patent
Yang et al.

(10) Patent No.: US 12,428,582 B2
(45) Date of Patent: Sep. 30, 2025

(54) CURABLE PRESSURE-SENSITIVE ADHESIVE COMPOSITION, CURABLE PRESSURE-SENSITIVE ADHESIVE TAPE, AND BATTERY PACK

(71) Applicant: 3M INNOVATIVE PROPERTIES COMPANY, St. Paul, MN (US)

(72) Inventors: Zhen Qian Yang, Shanghai (CN); Heng Yu Huan, Shanghai (CN); En Zhong Zhang, Shanghai (CN); Jie Huang, Shanghai (CN); Zheng Guan, Shanghai (CN); Rui Pan, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 832 days.

(21) Appl. No.: 17/612,694

(22) PCT Filed: May 19, 2020

(86) PCT No.: PCT/IB2020/054726
§ 371 (c)(1),
(2) Date: Nov. 19, 2021

(87) PCT Pub. No.: WO2020/240343
PCT Pub. Date: Dec. 3, 2020

(65) Prior Publication Data
US 2022/0251432 A1     Aug. 11, 2022

(30) Foreign Application Priority Data

May 28, 2019   (CN) ......................... 201910455167.X
May 28, 2019   (CN) ......................... 201920787826.5

(51) Int. Cl.
*C09J 163/00* (2006.01)
*C09J 7/26* (2018.01)
*C09J 7/38* (2018.01)
*C09J 133/08* (2006.01)
*H01M 50/124* (2021.01)
*H01M 50/129* (2021.01)
*H01M 50/588* (2021.01)
*H01M 50/595* (2021.01)

(52) U.S. Cl.
CPC ............... *C09J 163/00* (2013.01); *C09J 7/26* (2018.01); *C09J 7/385* (2018.01); *C09J 133/08* (2013.01); *H01M 50/1245* (2021.01); *H01M 50/129* (2021.01); *H01M 50/588* (2021.01); *H01M 50/595* (2021.01); *C09J 2203/33* (2013.01); *C09J 2423/106* (2013.01); *C09J 2433/00* (2013.01); *C09J 2463/00* (2013.01)

(58) Field of Classification Search
CPC ......... C09J 163/00; C09J 133/04; C08L 63/00
See application file for complete search history.

(56) References Cited

U.S. PATENT DOCUMENTS

| | | |
|---|---|---|
| 6,180,200 B1 | 1/2001 | Ha |
| 9,577,227 B2 | 2/2017 | Sumpf |
| 2018/0127625 A1* | 5/2018 | Shafer ................... C09J 133/14 |
| 2018/0258325 A1 | 9/2018 | Taniguchi |

FOREIGN PATENT DOCUMENTS

| | | |
|---|---|---|
| CN | 102832360 | 12/2012 |
| CN | 102952503 | 3/2013 |
| CN | 104762050 | 7/2015 |
| CN | 106785225 A † | 5/2017 |
| CN | 201126832 | 10/2018 |
| JP | 2015143352 A | 8/2015 |
| WO | WO 1992-020754 | 11/1992 |
| WO | WO9220754 A1 † | 11/1992 |
| WO | WO9429399 A1 † | 12/1994 |
| WO | 1996014349 A1 | 5/1996 |
| WO | WO9614349 A1 † | 5/1996 |
| WO | WO 99/63017 | 12/1999 |
| WO | 2002079337 A1 | 10/2002 |
| WO | WO02079337 A1 † | 10/2002 |
| WO | WO 2003-040250 | 5/2003 |
| WO | WO 2013-087351 | 6/2013 |
| WO | WO 2013-101693 | 7/2013 |

(Continued)

OTHER PUBLICATIONS

International Search Report for PCT International Application No. PCT/IB2020/054726, mailed on Aug. 21, 2020, 3 pages.
Zeon Chemicals L.P., HyTemp(r) 4051EP Product Specification Sheet (published Dec. 17, 2014); 1 pp.
International Preliminary Report on Patentabiility, International Patent Application No. PCT/IB2020/054726, issued on Nov. 16, 2021, published on Nov. 30, 2021, The International Bureau of WIPO.†
Zeon Chemicals I.P., HyTemp® 4051EP Product Specification Sheet, Published Dec. 17, 2014.†

*Primary Examiner* — Margaret G Moore
(74) *Attorney, Agent, or Firm* — Gregg H. Rosenblatt

(57) ABSTRACT

The present invention provides a curable pressure-sensitive adhesive composition, including a reactive polyacrylate, a liquid epoxy resin, a solid epoxy resin, a hydroxyl-containing compound, and a photoinitiator of specific contents. The curable pressure-sensitive adhesive composition may further include an epoxy silane coupling agent of a specific content. In addition, the present invention further provides a curable pressure-sensitive adhesive tape and a battery pack including the curable pressure-sensitive adhesive composition. The curable pressure-sensitive adhesive composition and the curable pressure-sensitive adhesive tape provided by the present invention have at least good bonding strength and good anti-warping performance, and can improve the stability and safety of battery packs.

10 Claims, 5 Drawing Sheets

(56) References Cited

FOREIGN PATENT DOCUMENTS

| WO | WO 2017/117163 | 7/2017 |
| WO | WO 2018-166216 | 9/2018 |

\* cited by examiner
† cited by third party

CURABLE PRESSURE-SENSITIVE ADHESIVE COMPOSITION, CURABLE PRESSURE-SENSITIVE ADHESIVE TAPE, AND BATTERY PACK

CROSS REFERENCE TO RELATED APPLICATIONS

This application is a national stage filing under 35 U.S.C. 371 of PCT/IB2020/054726, filed May 19, 2020, which claims the benefit of Chinese Pat. App. No. 201910455167.X, filed May 28, 2019, and Chinese Pat. App. No. 201920787826.5, filed May 28, 2019, the disclosures of each of which are incorporated by reference herein in their entireties.

TECHNICAL FIELD

The present invention relates to the field of pressure-sensitive adhesives, in particular to a curable pressure-sensitive adhesive composition, a curable pressure-sensitive adhesive tape, and a battery pack including the curable pressure-sensitive adhesive composition.

BACKGROUND

For hybrid vehicles and pure electric vehicles, the stability and safety of vehicle battery packs are of vital importance. In a vehicle battery pack, the reliability of an insulating part of the battery pack is an important factor affecting its stability and safety.

As well known, the operation environment of an automobile is complex, which may include environments with high temperature, high humidity, severe vibration, severe impact, etc. In such a complex or even harsh environment, the insulating part of the battery pack may encounter conditions of rupture and bonding failure, which may lead to failure of the insulating part or all of the battery pack, and consequently incur safety problems such as battery short-circuiting.

For the vehicle battery pack, an insulating method employed currently is to wrap a battery pack cell with a pressure-sensitive adhesive tape for insulation. This solution has advantages such as convenience in use and simple reassembly after removal, but the solution also has disadvantages such as low bonding strength. Generally, the bonding strength of an ordinary pressure-sensitive adhesive tape is less than 1 MPa, and therefore, the reliability of the ordinary pressure-sensitive adhesive tape used in the vehicle battery pack is poor. In addition, when the existing common pressure-sensitive adhesive is applied to the vehicle battery pack, bubbling and even warping may occur after bonding, and these disadvantages may cause potential safety hazards to a running vehicle.

Therefore, it is necessary to provide an insulating material with high bonding strength in a complex or even harsh environment to ensure and improve the safety performance of the vehicle battery pack.

SUMMARY

The present invention is intended to provide a curable pressure-sensitive adhesive composition and a curable pressure-sensitive adhesive tape with at least good bonding strength and good anti-warping performance, so as to apply them to battery packs (including but not limited to vehicle battery packs) to improve the stability and safety of the battery packs.

In one aspect, the present invention provides a curable pressure-sensitive adhesive composition, including: 30-65 parts of a reactive polyacrylate by weight; 30-50 parts of a liquid epoxy resin by weight; 5-20 parts of a solid epoxy resin by weight; 0.3-5 parts of a hydroxyl-containing compound by weight; and 0.02-3 parts of a photoinitiator by weight.

According to some specific embodiments of the present invention, the reactive polyacrylate is a polyacrylate with an epoxy group, a carboxyl group, or a hydroxyl group.

According to some specific embodiments of the present invention, the content of the reactive polyacrylate is 30-50 parts by weight.

According to some specific embodiments of the present invention, the epoxy equivalent of the liquid epoxy resin is 176-330 g/eq, and the epoxy equivalent of the solid epoxy resin is 450-800 g/eq.

According to some specific embodiments of the present invention, the content of the liquid epoxy resin is 30-40 parts by weight.

According to some specific embodiments of the present invention, the content of the solid epoxy resin is 10-20 parts by weight.

According to some specific embodiments of the present invention, the hydroxyl-containing compound is a polyol.

According to some specific embodiments of the present invention, the content of the hydroxyl-containing compound is 1-3 parts by weight.

According to some specific embodiments of the present invention, the content of the photoinitiator is 1-2 parts by weight.

According to some specific embodiments of the present invention, the curable pressure-sensitive adhesive composition further includes 0.05-1 part of an epoxy silane coupling agent by weight.

According to some specific embodiments of the present invention, the curable pressure-sensitive adhesive composition includes: 30-50 parts of the reactive polyacrylate by weight; 30-40 parts of the liquid epoxy resin by weight; 10-20 parts of the solid epoxy resin by weight; 1-3 parts of the hydroxyl-containing compound by weight; 1-2 parts of the photoinitiator by weight; and 0.05-1 part of an epoxy silane coupling agent by weight.

In another aspect, the present invention provides a curable pressure-sensitive adhesive tape, including at least one curable pressure-sensitive adhesive composition layer, the curable pressure-sensitive adhesive composition layer including the curable pressure-sensitive adhesive composition provided by the present invention.

According to some specific embodiments of the present invention, the curable pressure-sensitive adhesive tape is a single-sided curable pressure-sensitive adhesive tape, and the single-sided curable pressure-sensitive adhesive tape includes an electrical insulating layer and the curable pressure-sensitive adhesive composition layer provided on one side of the electrical insulating layer.

According to some specific embodiments of the present invention, the curable pressure-sensitive adhesive tape is a double-sided curable pressure-sensitive adhesive tape, and the double-sided curable pressure-sensitive adhesive tape includes an electrical insulating layer and the curable pressure-sensitive adhesive composition layers respectively provided on two sides of the electrical insulating layer.

According to some specific embodiments of the present invention, the electrical insulating layer includes a foam layer.

According to some specific embodiments of the present invention, the foam layer is a microporous polypropylene layer.

In another aspect, the present invention provides a battery pack, including: a first cell; and a cured first curable pressure-sensitive adhesive composition layer provided on at least part of an outer surface of the first cell, the first curable pressure-sensitive adhesive composition layer including the curable pressure-sensitive adhesive composition provided by the present invention.

According to some specific embodiments of the present invention, the battery pack includes: a first cell; a cured first curable pressure-sensitive adhesive composition layer provided on at least part of an outer surface of the first cell, the first curable pressure-sensitive adhesive composition layer including the curable pressure-sensitive adhesive composition provided by the present invention; and a first electrical insulating layer, the first electrical insulating layer being provided on one side of the cured first curable pressure-sensitive adhesive composition layer away from the first cell.

According to some specific embodiments of the present invention, the battery pack includes: a first cell; a cured first curable pressure-sensitive adhesive composition layer provided on at least part of an outer surface of the first cell, the first curable pressure-sensitive adhesive composition layer including the curable pressure-sensitive adhesive composition provided by the present invention; a first electrical insulating layer, the first electrical insulating layer being provided on one side of the cured first curable pressure-sensitive adhesive composition layer away from the first cell; and a cured second curable pressure-sensitive adhesive composition layer, the second curable pressure-sensitive adhesive composition layer including the curable pressure-sensitive adhesive composition provided by the present invention, the cured second curable pressure-sensitive adhesive composition layer being provided on one side of the first electrical insulating layer away from the cured first curable pressure-sensitive adhesive composition layer.

According to some specific embodiments of the present invention, the battery pack includes: a first cell; a cured first curable pressure-sensitive adhesive composition layer provided on at least part of an outer surface of the first cell, the first curable pressure-sensitive adhesive composition layer including the curable pressure-sensitive adhesive composition provided by the present invention; a first electrical insulating layer, the first electrical insulating layer being provided on one side of the cured first curable pressure-sensitive adhesive composition layer away from the first cell; a cured second curable pressure-sensitive adhesive composition layer, the second curable pressure-sensitive adhesive composition layer including the curable pressure-sensitive adhesive composition provided by the present invention, the cured second curable pressure-sensitive adhesive composition layer being provided on one side of the first electrical insulating layer away from the cured first curable pressure-sensitive adhesive composition layer; and a second cell, the second cell being provided on one side of the cured second curable pressure-sensitive adhesive composition layer away from the first electrical insulating layer.

According to some specific embodiments of the present invention, the battery pack includes: a first cell; a cured first curable pressure-sensitive adhesive composition layer provided on at least part of an outer surface of the first cell, the first curable pressure-sensitive adhesive composition layer including the curable pressure-sensitive adhesive composition provided by the present invention; a first electrical insulating layer, the first electrical insulating layer being provided on one side of the cured first curable pressure-sensitive adhesive composition layer away from the first cell; a cured second curable pressure-sensitive adhesive composition layer, the second curable pressure-sensitive adhesive composition layer including the curable pressure-sensitive adhesive composition provided by the present invention, the cured second curable pressure-sensitive adhesive composition layer being provided on one side of the first electrical insulating layer away from the cured first curable pressure-sensitive adhesive composition layer; and a battery pack side plate, the battery pack side plate being provided on one side of the cured second curable pressure-sensitive adhesive composition layer away from the first electrical insulating layer.

According to some specific embodiments of the present invention, the battery pack includes: a first cell; a cured first curable pressure-sensitive adhesive composition layer provided on at least part of an outer surface of the first cell, the first curable pressure-sensitive adhesive composition layer including the curable pressure-sensitive adhesive composition provided by the present invention; a first electrical insulating layer, the first electrical insulating layer being provided on one side of the cured first curable pressure-sensitive adhesive composition layer away from the first cell; a cured second curable pressure-sensitive adhesive composition layer, the second curable pressure-sensitive adhesive composition layer including the curable pressure-sensitive adhesive composition provided by the present invention, the cured second curable pressure-sensitive adhesive composition layer being provided on one side of the first electrical insulating layer away from the cured first curable pressure-sensitive adhesive composition layer; and a battery pack end plate, the battery pack end plate being provided on one side of the cured second curable pressure-sensitive adhesive composition layer away from the first electrical insulating layer.

According to some specific embodiments of the present invention, the battery pack includes: a first cell; a cured first curable pressure-sensitive adhesive composition layer provided on at least part of an outer surface of the first cell, the first curable pressure-sensitive adhesive composition layer including the curable pressure-sensitive adhesive composition provided by the present invention; a first electrical insulating layer, the first electrical insulating layer being provided on one side of the cured first curable pressure-sensitive adhesive composition layer away from the first cell; a cured second curable pressure-sensitive adhesive composition layer, the second curable pressure-sensitive adhesive composition layer including the curable pressure-sensitive adhesive composition provided by the present invention, the cured second curable pressure-sensitive adhesive composition layer being provided on one side of the first electrical insulating layer away from the cured first curable pressure-sensitive adhesive composition layer; and a battery pack bottom plate, the battery pack bottom plate being provided on one side of the cured second curable pressure-sensitive adhesive composition layer away from the first electrical insulating layer.

According to some specific embodiments of the present invention, the battery pack includes: a first cell; a cured first curable pressure-sensitive adhesive composition layer provided on at least part of an outer surface of the first cell, the first curable pressure-sensitive adhesive composition layer including the curable pressure-sensitive adhesive composition provided by the present invention; a first electrical insulating layer, the first electrical insulating layer being provided on one side of the cured first curable pressure-sensitive adhesive composition layer away from the first cell; a cured second curable pressure-sensitive adhesive composition layer, the second curable pressure-sensitive adhesive composition layer including the curable pressure-sensitive adhesive composition provided by the present invention, the cured second curable pressure-sensitive adhesive composition layer being provided on one side of the first electrical insulating layer away from the cured first curable pressure-sensitive adhesive composition layer; a second electrical insulating layer, the second electrical insulating layer being provided on one side of the cured second curable pressure-sensitive adhesive composition layer away from the first electrical insulating layer; a cured third curable pressure-sensitive adhesive composition layer, the third curable pressure-sensitive adhesive composition layer including the curable pressure-sensitive adhesive composition provided by the present invention, the cured third curable pressure-sensitive adhesive composition layer being provided on one side of the second electrical insulating layer away from the cured second curable pressure-sensitive adhesive composition layer; and a second cell, the second cell being provided on one side of the cured third curable pressure-sensitive adhesive composition layer away from the second electrical insulating layer.

After bonding, the curable pressure-sensitive adhesive composition and the curable pressure-sensitive adhesive tape provided by the present invention have good bonding strength, good anti-warping performance, and a relatively wide UV energy process window. In addition, the battery pack provided by the present invention has good safety performance.

DETAILED DESCRIPTION

Figure 1A:
FIG. 1(a) is a cross-sectional view of a curable pressure-sensitive adhesive tape provided according to some specific embodiments of the present invention.

The present invention provides a curable pressure-sensitive adhesive composition and a curable pressure-sensitive adhesive tape. The curable pressure-sensitive adhesive composition and the curable pressure-sensitive adhesive tape have a reactive polyacrylate/epoxy hybrid system, in which curing of the epoxy resin is initiated by a photoinitiator. This photoinitiator is induced by ultraviolet light, and even if an ultraviolet light source is removed, the photoinitiator can still continue initiating the reaction of epoxy groups at room temperature, so as to finish curing (the so-called living polymerization). Due to the reactivity of the polyacrylate, it can form an interpenetrating polymer network (IPN) with the epoxy resin, so as to develop resistance to higher temperatures.

Herein, a "curable pressure-sensitive adhesive" refers to a pressure-sensitive adhesive that can be defined by at least two characteristics below: (I) the adhesive is initially sticky at room temperature, and can be bonded to a surface of an object without being additionally heated; and (II) after being bonded to the surface of the object, the adhesive can be further chemically cross-linked, triggered by ultraviolet, visible light, heat, etc.

Herein, a "structural adhesive" refers to an adhesive with shear strength greater than 1000 psi (1 MPa is approximately equal to 145 psi).

Herein, "structural strength" refers to shear strength greater than 1000 psi.

Herein, "semi-structural strength" refers to shear strength greater than 100 psi but less than 1000 psi.

Herein, "warping" refers to the following situation: when a curable pressure-sensitive adhesive tape is bonded to a surface of an object, a bonding force of a curable pressure-sensitive adhesive layer of the pressure-sensitive adhesive tape after curing is less than an internal stress of a substrate layer (the substrate layer may be, but not limited to, an electrical insulating layer, a backing layer, etc.) of the pressure-sensitive adhesive tape, causing the substrate layer of the pressure-sensitive adhesive tape to separate from the surface of the object.

Herein, "bubbling" refers to the following situation: when a curable pressure-sensitive adhesive tape is bonded to a surface of an object, a bonding force of a curable pressure-sensitive adhesive layer of the pressure-sensitive adhesive tape after curing is less than an internal stress of a substrate layer (the substrate layer may be, but not limited to, an electrical insulating layer, a backing layer, etc.) of the pressure-sensitive adhesive tape, causing the cured pressure-sensitive adhesive layer to be stretched and produce a gap between the substrate layer of the pressure-sensitive adhesive tape and the bonded surface of the object.

The percentages, proportions, parts, concentrations, and the like referred to in the present invention are all based on weight unless otherwise specified.

The curable pressure-sensitive adhesive composition and the curable pressure-sensitive adhesive tape will be described below in more detail.

In one aspect, the present invention provides a curable pressure-sensitive adhesive composition, including: 30-65 parts of a reactive polyacrylate by weight; 30-50 parts of a liquid epoxy resin by weight; 5-20 parts of a solid epoxy resin by weight; 0.3-5 parts of a hydroxyl-containing compound by weight; and 0.02-3 parts of a photoinitiator by weight.

a) Reactive Polyacrylate

The curable pressure-sensitive adhesive composition provided by the present invention includes a reactive polyacrylate, i.e., a polyacrylate carrying a reactive functional group. Generally the reactive functional group may be an epoxy group, or alternatively a group such as carboxyl or hydroxyl.

Herein, the polyacrylate includes homopolymers of a polyacrylate and a polymethacrylate, or a copolymer containing at least one polyacrylate or polymethacrylate block. For example, the polyacrylate may include a C1-C10 alkyl polyacrylate, a C3-C8 cycloalkyl polyacrylate, a C6-C12 aryl polyacrylate, a C1-C10 alkyl polymethacrylate, a C3-C8 cycloalkyl polymethacrylate, or a C6-C12 aryl polymethacrylate; the polyacrylate may also include a copolymer of at least one block of a C1-C10 alkyl polyacrylate, a C3-C8 cycloalkyl polyacrylate, a C6-C12 aryl polyacrylate, a C1-C10 alkyl polymethacrylate, a C3-C8 cycloalkyl polymethacrylate, or a C6-C12 aryl polymethacrylate, in which the C1-C10 alkyl group, the C3-C8 cycloalkyl group, and the C6-C12 aryl group may be substituted by one or a plurality of substituents; the substituent may be independently selected from the group consisting of a hydroxyl group, a carboxyl group, and an epoxy group; and the substituent may also be a C3-C8 cycloalkyl group, a C6-C12 aryl group, or a C6-C12 aryloxy group optionally substituted by a hydroxyl group, a carboxyl group, or an epoxy group.

The reactive polyacrylate carrying the reactive functional group may be prepared by free-radical copolymerization or copolymerization of one or a plurality of acrylate monomers. These acrylate monomers should also have good compatibility with the epoxy resins. In addition, the acrylate may further include one or a plurality of epoxy, carboxyl, or hydroxyl groups.

According to some specific embodiments of the present invention, the reactive polyacrylate may be obtained by free-radical polymerization or copolymerization of one or a plurality of monomers selected from the group consisting of a C1-C10 alkyl acrylate, a C3-C8 cycloalkyl acrylate, a C6-C12 aryl acrylate, a C1-C10 alkyl methacrylate, a C3-C8 cycloalkyl methacrylate, and a C6-C12 aryl methacrylate. The C1-C10 alkyl group, the C3-C8 cycloalkyl group, and the C6-C12 aryl group may be substituted by one or a plurality of substituents. The substituent may be independently selected from the group consisting of a hydroxyl group, a carboxyl group, and an epoxy group; and the substituent may also be a C3-C8 cycloalkyl group, a C6-C12 aryl group, or a C6-C12 aryloxy group optionally substituted by a hydroxyl group, a carboxyl group, or an epoxy group. Examples of the C1-C10 alkyl acrylate include, but are not limited to, one or a plurality from the group consisting of methyl acrylate, ethyl acrylate, propyl acrylate, isopropyl acrylate, butyl acrylate, isobutyl acrylate, tert-butyl acrylate, and hexyl acrylate. Examples of the C1-C10 alkyl methacrylate include, but are not limited to, methyl methacrylate, ethyl methacrylate, propyl methacrylate, isopropyl methacrylate, butyl methacrylate, isobutyl methacrylate, tert-butyl methacrylate, or hexyl methacrylate, etc. Examples of the C3-C8 cycloalkyl acrylate include, but are not limited to, cyclopropyl acrylate, cyclobutyl acrylate, cyclopentyl acrylate, or cyclohexyl acrylate, etc. Examples of the C3-C8 cycloalkyl methacrylate include, but are not limited to, cyclopropyl methacrylate, cyclobutyl methacrylate, cyclopentyl methacrylate, or cyclohexyl methacrylate, etc. Examples of the C6-C12 aryl acrylate include, but are not limited to, phenyl acrylate, or naphthyl acrylate, etc. Examples of the C6-C12 aryl methacrylate include, but are not limited to, phenyl methacrylate, or naphthyl methacrylate, etc. According to some specific embodiments of the present invention, the C1-C10 alkyl group is preferably a C1-C6 alkyl group, the C3-C8 cycloalkyl group is preferably a C3-C6 cycloalkyl group, and the C6-C12 aryl group is preferably a C6-C10 aryl group.

Selectable examples of the acrylate monomer include, but are not limited to, butyl acrylate (BA), methyl acrylate (MA), phenoxyethyl acrylate (PEA), or (2-hydroxy-3-phenoxypropyl)acrylate (HPPA), etc. Selectable examples of the reactive monomer carrying the epoxy group include, but are not limited to, glycidyl methacrylate (GMA), or (3,4-epoxy-cyclohexylmethyl)acrylate (ECA), etc. According to some preferred embodiments of the present invention, HPPA may be selected as a monomer because of its good compatibility with epoxy resins.

Based on 100 wt. % of the polyacrylate, the proportion of the monomer with the reactive group such as an epoxy group, a hydroxyl group, or a carboxyl group is 1.5-30 wt. %, preferably 2-25 wt. %, more preferably 3-20 wt. %. If the content of the monomer with the reactive group such as an epoxy group, a hydroxyl group, or a carboxyl group is overly low, it is difficult to form an interpenetrating polymer network (IPN), consequently affecting the temperature resistance of the curable pressure-sensitive adhesive composition; if the content of the monomer with the reactive group such as an epoxy group, a hydroxyl group, or a carboxyl group is overly high, the crosslinking density of the curable pressure-sensitive adhesive composition may be overly high, resulting in higher brittleness.

The above reactive polyacrylate carrying the reactive functional group can be synthesized by a conventional method of solvent free-radical polymerization. Solvents that may be used include, but are not limited to, an ester, an alcohol, a ketone, a carboxylic acid, an aliphatic hydrocarbon, a cyclane, a haloalkane, or an aromatic hydrocarbon, etc.; examples of the solvent include, but are not limited to, one or a plurality from the group consisting of: ethyl acetate, n-butanol, acetone, acetic acid, benzene, toluene, ethylbenzene, isopropylbenzene, t-butylbenzene, heptane, cyclohexane, 1-chlorobutane, 1-bromobutane, and 1-iodobutane, etc. Initiators that may be used in the synthesis of the reactive polyacrylate include, but are not limited to, azo initiators and peroxide initiators. Examples of the initiator include, but are not limited to, azobisisobutyronitrile (AIBN), azobisisoheptonitrile (ABVN), 2,2'-azobis(2-methylbutyronitrile) (AMBN), benzoyl peroxide (BPO), or a persulfate.

According to some specific embodiments of the present invention, the content of the reactive polyacrylate carrying the reactive functional group in the curable pressure-sensitive adhesive composition provided by the present invention is 30-65 parts by weight, preferably 30-60 parts by weight, more preferably 30-50 parts by weight. When the content of the reactive polyacrylate is within the above range, the reactive polyacrylate can have good compatibility with the epoxy resins, and the curable pressure-sensitive adhesive composition containing the reactive polyacrylate of the content has not only good final bonding strength, but also good toughness after curing.

It needs to be pointed out that, when the content of the reactive polyacrylate in the curable pressure-sensitive adhesive composition is overly high, the content of the epoxy resins is correspondingly overly low, and the bonding strength of the cured insulating pressure-sensitive adhesive may be poor. When the content of the reactive polyacrylate in the curable pressure-sensitive adhesive composition is overly low, the toughness of the cured insulating pressure-sensitive adhesive may be not good.

b) Epoxy Resin

The curable pressure-sensitive adhesive composition provided by the present invention includes at least two epoxy resins. According to some specific embodiments of the present invention, the molecules of the epoxy resins contain two or more epoxy groups. Specifically, well-known epoxy resins obtained by reaction of a polyphenol such as bisphenol A, bisphenol F, bisphenol S, hexahydrobisphenol A, tetramethyl bisphenol A, diaryl bisphenol A, and tetramethyl bisphenol F with epichlorohydrin, may be used, for example a glycidyl ether, a cycloaliphatic epoxy resin, and an epoxidized polyolefin, etc.

The epoxy resin in the present invention is a mixture of a liquid epoxy resin and a solid epoxy resin. In the present invention, the liquid epoxy resin refers to an epoxy resin that is liquid at room temperature. According to some specific embodiments of the present invention, the liquid epoxy resin may be a liquid epoxy resin with an epoxy equivalent of 176-330 g/eq. For example, examples of the liquid epoxy resin include, but are not limited to, liquid epoxy resins derived from bisphenol A, such as EPOKUKDO YD128 (epoxy equivalent: approximately 187) commercially available from Kunshan (Kudko) Chemical (Korea); NEPL-128 (epoxy equivalent: approximately 184-190) commercially available from Taiwan Nanya Resin Co., Ltd.; DER331 (epoxy equivalent: approximately 182-192) from Dow Chemical Company; E-51 (epoxy equivalent: approximately 185-210) from Blue Star Material (Wuxi) Co., Ltd.; or EPON 828 (epoxy equivalent: approximately 185-192) from Shell Oil Company. The solid epoxy resin refers to an epoxy resin that is solid at room temperature. According to some specific embodiments of the present invention, the solid epoxy resin may be a solid epoxy resin with an epoxy equivalent of 450-800 g/eq. For example, examples of the solid epoxy resin include, but are not limited to, solid epoxy resins derived from bisphenol A, such as NEPS-901 (epoxy equivalent: approximately 450-500) commercially available from Taiwan Nanya Resin Co., Ltd., EPOKUKDO YD011 (epoxy equivalent: approximately 450-500) commercially available from Kukdo Chemical (Kunshan) Co., Ltd., Korea, E-20 (epoxy equivalent: approximately 440-550) commercially available from Blue Star Material (Wuxi) Co., Ltd., DER661 (epoxy equivalent: approximately 500-560) commercially available from Dow Chemical Company, or EPON1001 (epoxy equivalent: approximately 525-550) commercially available from Shell Oil Company.

Furthermore, as found by the inventor, when the epoxy resin component is a mixture of the liquid epoxy resin and the solid epoxy resin, and the amount of the liquid epoxy resin in the composition is 30-50 parts by weight, preferably 30-40 parts by weight, and the amount of the solid epoxy resin is 5-20 parts by weight, preferably 10-20 parts by weight, warping can be effectively prevented by virtue of a synergistic effect of the two epoxy resins without obviously reducing the bonding strength.

As also found by the inventor, when the epoxy resin component consists of only the solid epoxy resin, the bonding strength of the cured pressure-sensitive adhesive is lower; when the epoxy resin component consists of only the liquid epoxy resin, although the bonding strength of the cured pressure-sensitive adhesive may be higher, the problem of warping will occur.

As also found by the inventor, when the total amount of the epoxy resin component is overly small, the bonding strength of the cured pressure-sensitive adhesive is poor. When the total amount of the epoxy resin component is overly great, the toughness of the cured pressure-sensitive adhesive is not good. That is to say, the cured pressure-sensitive adhesive is brittle.

In addition, when the content of the solid epoxy resin in the curable pressure-sensitive adhesive composition is overly low, the anti-warping performance of the cured insulating pressure-sensitive adhesive is insufficient; when the content of the solid epoxy resin in the curable pressure-sensitive adhesive composition is overly high, the bonding strength of the cured insulation pressure-sensitive adhesive is insufficient. When the content of the liquid epoxy resin in the curable pressure-sensitive adhesive composition is overly low, the bonding strength of the cured pressure-sensitive adhesive is insufficient; when the content of the liquid epoxy resin in the curable pressure-sensitive adhesive composition is overly high, the cured pressure-sensitive adhesive is prone to bubbling and warping.

c) Hydroxyl-Containing Compound

The curable pressure-sensitive adhesive composition provided by the present invention includes a hydroxyl-containing compound. The hydroxyl-containing compound includes ether or ester derivatives. According to some specific embodiments of the present invention, the hydroxyl-containing compound is a polyol. The hydroxyl-containing compound acts as a chain transfer agent when the epoxy groups react according to a cation mechanism.

According to some specific embodiments of the present invention, the polyol includes, but is not limited to, one or a plurality from the group consisting of a polyether polyol and a polyester polyol. The polyether polyol includes, but is not limited to, one or a plurality from the group consisting of a polyether triol and a polyether diol. The polyester polyol includes, but is not limited to, one or a plurality from the group consisting of a polyester triol, a polyester diol, and a bisphenol A polyol. According to some specific embodiments of the present invention, the polyol may be selected from TONE 0230 Polyol, VORANOL 230-238, and Varonol 2070 commercially available from Dow Chemical Company, U.S. and Dianol 285 commercially available from Seppic Company, France, etc. According to some specific embodiments of the present invention, the polyol is preferably Varonol 2070 commercially available from Dow Chemical Company, U.S., which is a polyether triol with a molecular weight of 700.

In the curable pressure-sensitive adhesive composition provided by the present invention, the content of the polyol is generally 0.3-5 parts by weight, preferably 2-4 parts by weight, more preferably 1-3 parts by weight. If the content of the polyol is overly low, the UV-induced curing speed of the curable pressure-sensitive adhesive composition is slow, and a cured adhesive tape is relatively brittle; if the content of the polyol is overly high, the cured curable pressure-sensitive adhesive composition is relatively soft, and the shear strength is insufficient.

d) Photoinitiator

The amount of the photoinitiator in the curable pressure-sensitive adhesive composition of the reactive polyacrylate/epoxy hybrid system carrying the reactive functional group is very small, but the photoinitiator has a great influence on the curing speed and storage stability of the curable pressure-sensitive adhesive composition.

The photoinitiator may be at least one of cationic photoinitiators or a mixture of at least one cationic photoinitiator and at least one free radical photoinitiator.

According to some specific embodiments of the present invention, the cationic photoinitiator includes, but is not limited to, one or a plurality from the group consisting of a diazonium salt, an iodonium salt, a sulfonium salt, an antimonate, and an iron arene. According to some specific embodiments of the present invention, specific examples of the cationic photoinitiator include, but are not limited to, one or a plurality from the group consisting of a diaryliodonium salt, a triarylsulfonium salt, an alkylsulfonium salt, an iron arene salt, a sulfonyloxy ketone, a triaryl siloxyether, a triarylsulfonium hexafluorophosphate salt, and a hexafluoroantimonate salt. According to some specific embodiments of the present invention, the cationic photoinitiator is preferably a triarylsulfonium hexafluorophosphate salt or a hexafluoroantimonate salt.

According to some specific embodiments of the present invention, the free radical photoinitiator includes, but is not limited to, one or a plurality from the group consisting of benzoin and derivatives, benzil and derivatives, an alkyl benzophenone and derivatives, and an acyl phosphine oxide. According to some specific embodiments of the present invention, the benzoin and derivatives include, but are not limited to, one or a plurality from the group consisting of benzoin, benzoin dimethyl ether, benzoin ether, benzoin isopropyl ether, and benzoin butyl ether. According to some specific embodiments of the present invention, the benzil and derivatives include, but are not limited to, one or a plurality from the group consisting of diphenylethanone and α,α-dimethoxy-α-phenylacetophenone. According to some specific embodiments of the present invention, the alkyl benzophenone includes, but is not limited to, one or a plurality from the group consisting of α,α-diethoxyacetophenone, an α-hydroxyalkylbenzene ketone, and an α-aminoalkylbenzene ketone. According to some specific embodiments of the present invention, the acyl phosphine oxide includes, but is not limited to, one or a plurality from the group consisting of an aroyl phosphine oxide and bis(benzoyl)phenylphosphine oxide.

In the curable pressure-sensitive adhesive composition provided by the present invention, the content of the photoinitiator is 0.02-3 parts by weight, preferably 0.5-2.5 parts by weight, more preferably 1-2 parts by weight. Generally speaking, the curing speed of the curable pressure-sensitive adhesive composition increases with the increase of the content of the photoinitiator. When the content of the photoinitiator is overly low, the required irradiation energy of UV during curing is high and the curing speed is overly low. On the contrary, when the content of the photoinitiator is overly high, the required irradiation energy of UV during curing is low and the curing speed is overly high, and the curable pressure-sensitive adhesive composition can be cured even under sunlight or fluorescent lamp light (containing a small amount of UV light), which may affect the storage stability of the curable pressure-sensitive adhesive composition at room temperature.

e) Epoxy Silane Coupling Agent

As further unexpectedly found by the inventor, by adding an appropriate amount of an epoxy silane coupling agent to the UV induction curable pressure-sensitive adhesive composition provided by the present invention, the UV excitation energy process window during UV curing can be effectively expanded.

UV energy may also be called as UV radiation dose, which refers to the UV radiation energy applied on unit area. The unit of the UV energy is usually $mJ/cm^2$.

According to conventional experience, the strength of pressure-sensitive adhesives is sensitive to UV energy, and the adhesives can reach sufficient strength only in a narrow UV energy process window. When UV light is applied to the UV induction curable pressure-sensitive adhesive composition, the UV energy must be within a certain range, that is, the UV excitation energy process window. When the UV energy is overly low, it is not enough to fully induce the curing of the curable pressure-sensitive adhesive composition. In particular, the content of the epoxy resins in the curable pressure-sensitive adhesive composition provided by the present invention is relatively high. In this case, the peeling force is very sensitive to UV energy. If the UV intensity is overly high, the peeling force of the cured pressure-sensitive adhesive will be overly small. Therefore, the UV intensity should be limited in the curing process. Such limitation imposes strict requirements on the process and is not conducive to rapid curing. However, as unexpectedly found by the inventor, according to some specific embodiments of the present invention, the epoxy functional group silane coupling agent can be added to the curable pressure-sensitive adhesive composition to enable a synergistic effect with other components of the curable pressure-sensitive adhesive composition provided by the present invention, thus greatly improving the upper energy limit of the UV excitation energy process window.

According to some specific embodiments of the present invention, the epoxy functional group silane coupling agent contains not only hydrolyzable groups such as ethoxyl or methoxyl, but also a silane that can react with the epoxy groups. According to some specific embodiments of the present invention, the epoxy functional group silane coupling agent may be KH560 or KH561 commercially available from Nanjing Shuguang Chemical Group Co., Ltd. or KBM303 commercially available from Shin-Etsu Chemical.

When no UV induction curable epoxy silane coupling agent is present in the curable pressure-sensitive adhesive composition provided by the present invention, the UV excitation energy process window of the composition is narrow. For example, according to some specific embodiments of the present invention, if the curable pressure-sensitive adhesive composition does not include the epoxy silane coupling agent, when UV energy up to 2000 $mJ/cm^2$ is applied, the peeling force of the cured pressure-sensitive adhesive will greatly decrease. When the curable pressure-sensitive adhesive composition includes the epoxy silane coupling agent, the UV excitation energy process window can greatly increase. For example, according to some specific embodiments of the present invention, the UV excitation energy process window may be as high as 5000 $mJ/cm^2$. Even under irradiation by such high UV excitation energy, the peeling force of the cured pressure-sensitive adhesive is still high.

Accordingly, it can be seen that a wider UV excitation energy process window can not only relax process conditions for the induced curing of the pressure-sensitive adhesive, but also accelerate the curing process of the pressure-sensitive adhesive.

In another aspect, the present invention provides a curable pressure-sensitive adhesive tape, which includes at least one curable pressure-sensitive adhesive composition layer. The curable pressure-sensitive adhesive composition layer includes the curable pressure-sensitive adhesive composition provided by the present invention.

After bonding, the curable pressure-sensitive adhesive tape provided by the present invention has structural strength or semi-structural strength, and does not warp at edges. In addition, when the curable pressure-sensitive adhesive composition provided by the present invention includes an appropriate amount of an epoxy silane coupling agent, the prepared curable pressure-sensitive adhesive tape can be cured in a relatively wide UV excitation energy process window.

According to some specific embodiments of the present invention, the curable pressure-sensitive adhesive tape may be a single-sided curable pressure-sensitive adhesive tape. Referring to FIG. 1(a), the single-sided curable pressure-sensitive adhesive tape includes an electrical insulating layer (also called as "substrate layer") 2 and a curable pressure-sensitive adhesive composition layer 1 provided on one side of the electrical insulating layer 2.

Figure 1B:
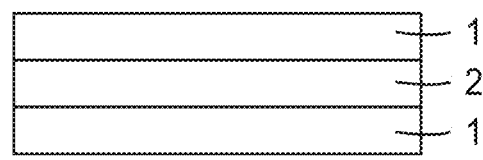
FIG. 1(b) is a cross-sectional view of a curable pressure-sensitive adhesive tape provided according to some specific embodiments of the present invention.

According to some specific embodiments of the present invention, the curable pressure-sensitive adhesive tape may be a double-sided curable pressure-sensitive adhesive tape. Referring to FIG. 1(b), the double-sided curable pressure-sensitive adhesive tape includes an electrical insulating layer 2 and the curable pressure-sensitive adhesive composition layers 1 respectively provided on two sides of the electrical insulating layer 2.

Figure 1C:
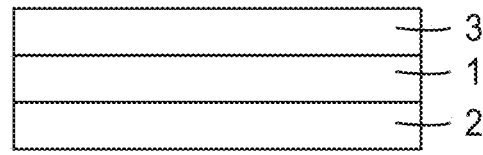
FIG. 1(c) is a cross-sectional view of a curable pressure-sensitive adhesive tape provided according to some specific embodiments of the present invention.
Figure 1D:
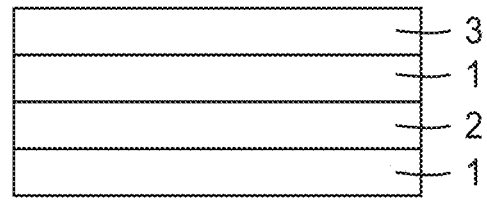
FIG. 1(d) is a cross-sectional view of a curable pressure-sensitive adhesive tape provided according to some specific embodiments of the present invention.

According to some specific embodiments of the present invention, referring to FIG. 1(c) or FIG. 1(d), the curable pressure-sensitive adhesive tape may further include a release layer 3.

According to some specific embodiments of the present invention, the electrical insulating layer of the curable pressure-sensitive adhesive tape may be a foam layer. According to some specific embodiments of the present invention, the foam layer may be a microporous polypropylene layer.

According to some specific embodiments of the present invention, the electrical insulating layer may be any one commonly used in the field, such as a film formed by one or a plurality selected from the group consisting of a polyester, a polycarbonate, a polyamide, a polyimide, a polyacrylate, and a polyolefin. Examples of the electrical insulating layer include, but are not limited to, a polyethylene terephthalate (PET) film, a polyimide (PI) film, a polypropylene (PP) film, a polyethylene (PE) film, etc. According to some specific embodiments of the present invention, the thickness of the electrical insulating layer may be 0.002-2 mm, preferably 0.005-1 mm, more preferably 10-500 µm.

According to some specific embodiments of the present invention, the electrical insulating layer may be a foam layer. When the electrical insulating layer is a foam layer, the curable pressure-sensitive adhesive tape has elasticity and deformability. According to some specific embodiments of the present invention, layers containing the curable pressure-sensitive adhesive composition provided by the present invention may be respectively provided on two sides of the foam layer, so as to form a double-sided adhesive tape. When used in a battery pack, such a curable pressure-sensitive adhesive tape can provide high bonding strength and adapt to assembly mechanical tolerance, which helps to improve the safety of the battery pack.

According to some specific embodiments of the present invention, the foam layer may be a microporous polypropylene layer. The use of the microporous polypropylene layer as the electrical insulating layer can further provide appropriate strength and deformability for the curable pressure-sensitive adhesive tape provided by the present invention.

According to some specific embodiments of the present invention, the curable pressure-sensitive adhesive tape provided by the present invention can be prepared by the following steps: coating the curable pressure-sensitive adhesive composition provided by the present invention in a flowing form on a substrate layer (for example, an electrical insulating layer) by adopting a conventional coating method, and then removing a solvent by heating, to form an adhesive film with certain thickness, so as to obtain a curable pressure-sensitive adhesive tape.

Overly high or overly low viscosity of the curable pressure-sensitive adhesive composition is not conducive to the coating of the curable pressure-sensitive adhesive composition. A solvent, e.g., an ester, an alcohol, a ketone, a carboxylic acid, an aliphatic hydrocarbon, a cyclane, a haloalkane, an aromatic hydrocarbon, etc., may be added in order to adjust the viscosity. Examples of the solvent include but are not limited to one or a plurality from the group consisting of ethyl acetate, n-butanol, isopropanol, acetone, acetic acid, benzene, toluene, ethylbenzene, isopropylbenzene, t-butylbenzene, heptane, cyclohexane, 1-chlorobutane, 1-bromobutane, and 1-iodobutane.

Useful coating methods include roll knife coating, comma roll coating, dragging blade coating, reverse roll coating, winding bar (Mayer) coating, gravure roll coating, slit-type die extrusion (Die) coating, etc. Preferable coating methods are comma roll coating and slit-type die extrusion (Die) coating.

According to some specific embodiments of the present invention, the thickness of the pressure-sensitive adhesive layer (dry adhesive thickness) may be 15-75 µm.

According to some specific embodiments of the present invention, a piece of single-sided release paper or release film with certain thickness may further be provided on one side of the adhesive film away from the electrical insulating layer. According to some specific embodiments of the present invention, the curable pressure-sensitive adhesive tape may further include a release layer, such as release paper. The release layer forms contact with an outer surface of the pressure-sensitive adhesive layer, that is, the release layer forms contact with a surface of the pressure-sensitive adhesive layer opposite to the surface in contact with the substrate, so as to protect the pressure-sensitive adhesive layer. During use, the release layer can be peeled off to expose the pressure-sensitive adhesive layer for use. According to some specific embodiments of the present invention, the release layer includes, but is not limited to, one or a plurality from the group consisting of cellophane, laminated paper, a polyester film, and a polypropylene film.

According to some examples of the present invention, the shear strength of the cured curable pressure-sensitive adhesive tape can reach semi-structural strength, i.e., greater than 100 psi, equivalent to approximately 0.7 MPa. According to some specific embodiments of the present invention, the shear strength of the cured curable pressure-sensitive adhesive tape can reach structural strength, i.e., greater than 1000 psi, equivalent to approximately 6.9 MPa.

Figure 2:
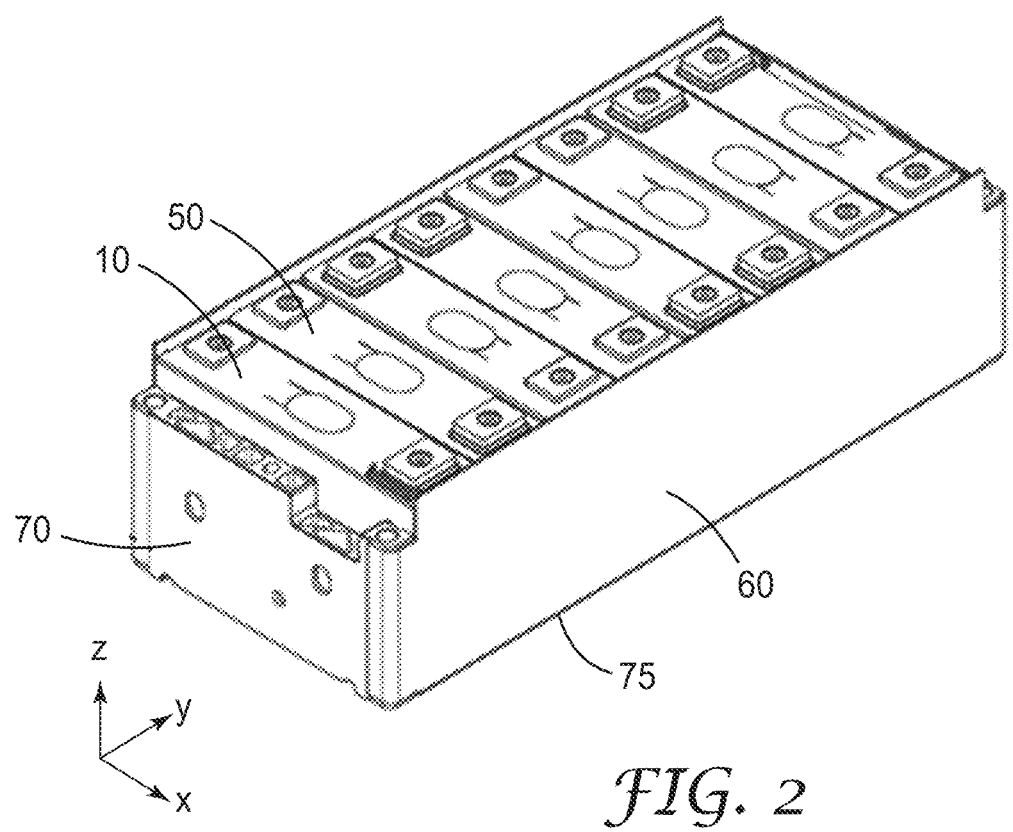
FIG. 2 is a three-dimensional stereoscopic schematic view of a battery pack provided according to some specific embodiments of the present invention.
Figure 3:
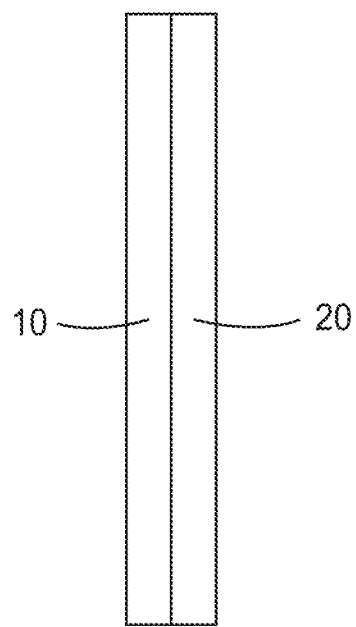
FIG. 3 is a cross-sectional schematic view of a battery pack provided according to some specific embodiments of the present invention.

In another aspect, the present invention provides a battery pack (for example, a vehicle battery pack). Referring to FIG. 2 and FIG. 3, the battery pack includes: a first cell 10; and a cured first curable pressure-sensitive adhesive composition layer 20 provided on at least part of an outer surface of the first cell 10, the first curable pressure-sensitive adhesive composition layer 20 including the curable pressure-sensitive adhesive composition provided by the present invention.

The curable pressure-sensitive adhesive composition provided by the present invention can be applied to the surface of the cell (usually made of metal) of the battery pack. The UV-cured curable pressure-sensitive adhesive composition layer including the curable pressure-sensitive adhesive composition provided by the present invention can bond an insulating material to the surface of the cell of the battery pack, and provide good bonding strength and good anti-warping performance, and ensure that the insulating material bonded to the surface of the cell does not rupture or fail in bonding even under complex or even harsh conditions such as high temperature, high humidity, severe vibration, or severe impact, thus preventing failure in insulation of the battery pack from occurring, and improving the insulation, stability, and safety of the battery pack.

Figure 4:
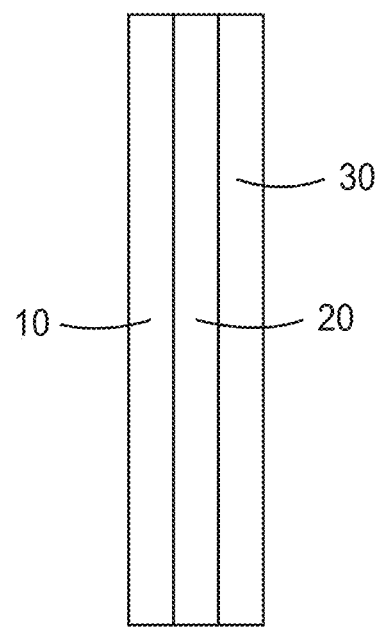
FIG. 4 is a cross-sectional schematic view of a battery pack provided according to some specific embodiments of the present invention.

According to some specific embodiments of the present invention, referring to FIG. 2 and FIG. 4, the battery pack at least includes: a first cell 10; a cured first curable pressure-sensitive adhesive composition layer 20 provided on at least part of an outer surface of the first cell 10, the first curable pressure-sensitive adhesive composition layer 20 including the curable pressure-sensitive adhesive composition provided by the present invention; and a first electrical insulating layer 30, the first electrical insulating layer 30 being provided on one side of the cured first curable pressure-sensitive adhesive composition layer 20 away from the first cell 10. According to these specific embodiments, the first electrical insulating layer 30 may be stably and firmly bonded to the outer surface of the first cell 10, and bonding failure such as warping will not occur.

Figure 5:
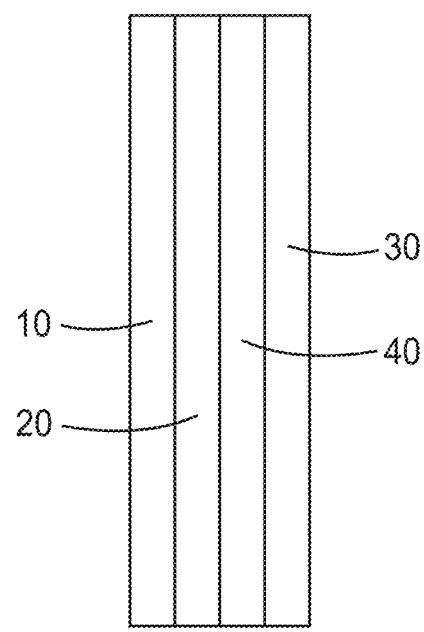
FIG. 5 is a cross-sectional schematic view of a battery pack provided according to some specific embodiments of the present invention.

According to some specific embodiments of the present invention, referring to FIG. 2 and FIG. 5, the battery pack at least includes: a first cell 10; a cured first curable pressure-sensitive adhesive composition layer 20 provided on at least part of an outer surface of the first cell 10, the first curable pressure-sensitive adhesive composition layer 20 including the curable pressure-sensitive adhesive composition provided by the present invention; a first electrical insulating layer 30, the first electrical insulating layer 30 being provided on one side of the cured first curable pressure-sensitive adhesive composition layer 20 away from the first cell 10; and a cured second curable pressure-sensitive adhesive composition layer 40, the second curable pressure-sensitive adhesive composition layer 40 including the curable pressure-sensitive adhesive composition provided by the present invention, the cured second curable pressure-sensitive adhesive composition layer 40 being provided on one side of the first electrical insulating layer 30 away from the cured first curable pressure-sensitive adhesive composition layer 20. According to these specific embodiments, as needed, other components of the battery pack may be bonded on one side of the second electrical insulating layer 40 away from the first electrical insulating layer 30.

Figure 6:
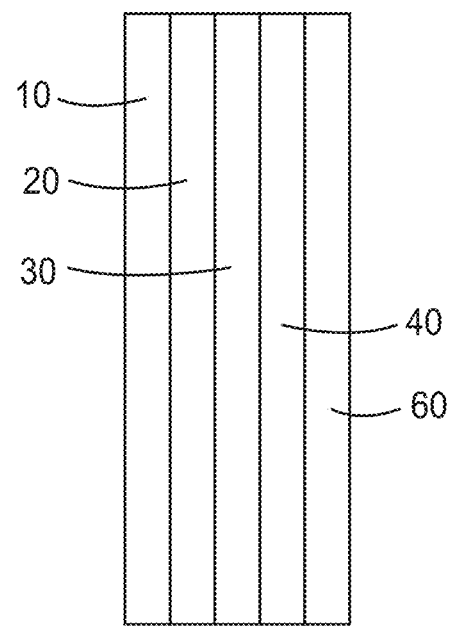
FIG. 6 is a sectional schematic view of a battery pack provided according to some specific embodiments of the present invention.

According to some specific embodiments of the present invention, referring to FIG. 2 and FIG. 6, the battery pack at least includes: a first cell 10; a cured first curable pressure-sensitive adhesive composition layer 20 provided on at least part of an outer surface of the first cell 10, the first curable pressure-sensitive adhesive composition layer 20 including the curable pressure-sensitive adhesive composition provided by the present invention; a first electrical insulating layer 30, the first electrical insulating layer 30 being provided on one side of the cured first curable pressure-sensitive adhesive composition layer 20 away from the first cell 10; a cured second curable pressure-sensitive adhesive composition layer 40, the second curable pressure-sensitive adhesive composition layer 40 including the curable pressure-sensitive adhesive composition provided by the present invention, the cured second curable pressure-sensitive adhesive composition layer 40 being provided on one side of the first electrical insulating layer 30 away from the cured first curable pressure-sensitive adhesive composition layer 20; and a second cell 50, the second cell 50 being provided on one side of the cured second curable pressure-sensitive adhesive composition layer 40 away from the first electrical insulating layer 30. According to these specific embodiments, a battery pack including two cells may be obtained, and the cured curable pressure-sensitive adhesive composition layer provided by the present invention stably and firmly bonds the two cells of the battery pack, and provides electrical insulating layer protection between the two cells. In addition, in these specific embodiments, a structure including the cured first curable pressure-sensitive adhesive composition layer 20, the first electrical insulating layer 30, and the cured second curable pressure-sensitive adhesive composition layer 40 may be provided in the form of a cured double-sided curable pressure-sensitive adhesive tape. That is to say, the double-sided curable pressure-sensitive adhesive tape may include the first curable pressure-sensitive adhesive composition layer 20, the first electrical insulating layer 30, and the second curable pressure-sensitive adhesive composition layer 40. During use, one curable pressure-sensitive adhesive composition layer of the curable pressure-sensitive adhesive tape may be bonded to a surface of the first cell firstly, and then after initiation of the curing of the curable pressure-sensitive adhesive composition layer, the other curable pressure-sensitive adhesive composition layer of the curable pressure-sensitive adhesive tape may be bonded to a surface of the second cell. After curing, the two cells can be stably and firmly bonded together, and electrical insulating layer protection can be provided between the two cells. Further, as required, according to the ideas provided in these specific embodiments, the cured curable pressure-sensitive adhesive composition layer provided by the present invention may also be used to stably and firmly bond a plurality of cells of a battery pack, and provide electrical insulating layer protection between every two cells.

Figure 7:
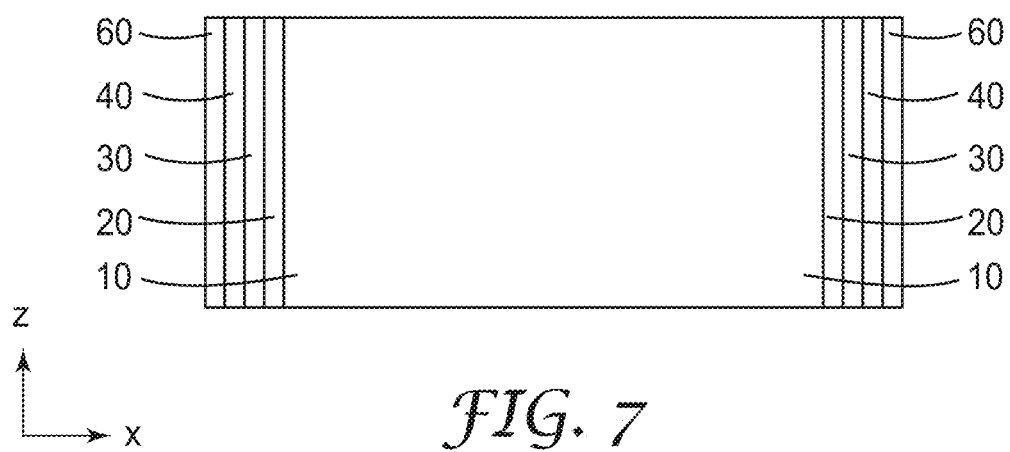
FIG. 7 is an x-z cross-sectional schematic view of the battery pack illustrated in FIG. 2 (the bottom plate 75 of the battery pack is not illustrated in FIG. 7).

According to some specific embodiments of the present invention, referring to FIG. 2 and FIG. 7, the battery pack at least includes: a first cell 10; a cured first curable pressure-sensitive adhesive composition layer 20 provided on at least part of an outer surface of the first cell 10, the first curable pressure-sensitive adhesive composition layer 20 including the curable pressure-sensitive sensitive adhesive composition provided by the present invention; a first electrical insulating layer 30, the first electrical insulating layer 30 being provided on one side of the cured first curable pressure-sensitive adhesive composition layer 20 away from the first cell 10; a cured second curable pressure-sensitive adhesive composition layer 40, the second curable pressure-sensitive adhesive composition layer 40 including the curable pressure-sensitive adhesive composition provided by the present invention, the cured second curable pressure-sensitive adhesive composition layer 40 being provided on one side of the first electrical insulating layer 30 away from the cured first curable pressure-sensitive adhesive composition layer 20; and a battery pack side plate 60, the battery pack side plate 60 being provided on one side of the cured second curable pressure-sensitive adhesive composition layer 40 away from the first electrical insulating layer 30. According to these specific embodiments, stable and firm bonding can be provided between the cell and the side plate of the battery pack, and electrical insulating layer protection can be provided between the cell and the side plate.

Figure 8:
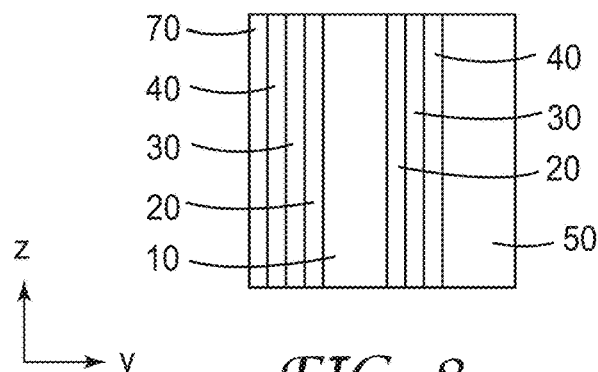
FIG. 8 is a y-z cross-sectional schematic view of the battery pack illustrated in FIG. 2 (neither the bottom plate 75 of the battery pack nor other cells except the first cell 10 and the second cell 50 are illustrated in FIG. 8).

According to some specific embodiments of the present invention, referring to FIG. 2 and FIG. 8, the battery pack at least includes: a first cell 10; a cured first curable pressure-sensitive adhesive composition layer 20 provided on at least part of an outer surface of the first cell 10, the first curable pressure-sensitive adhesive composition layer 20 including the curable pressure-sensitive adhesive composition provided by the present invention; a first electrical insulating layer 30, the first electrical insulating layer 30 being provided on one side of the cured first curable pressure-sensitive adhesive composition layer 20 away from the first cell 10; a cured second curable pressure-sensitive adhesive composition layer 40, the second curable pressure-sensitive adhesive composition layer 40 including the curable pressure-sensitive adhesive composition provided by the present invention, the cured second curable pressure-sensitive adhesive composition layer 40 being provided on one side of the first electrical insulating layer 30 away from the cured first curable pressure-sensitive adhesive composition layer 20; and a battery pack end plate 70, the battery pack end plate 70 being provided on one side of the cured second curable pressure-sensitive adhesive composition layer 40 away from the first electrical insulating layer 30. According to these specific embodiments, stable and firm bonding can be provided between the cell and the end plate of the battery pack, and electrical insulating layer protection can be provided between the cell and the end plate.

Figure 9:
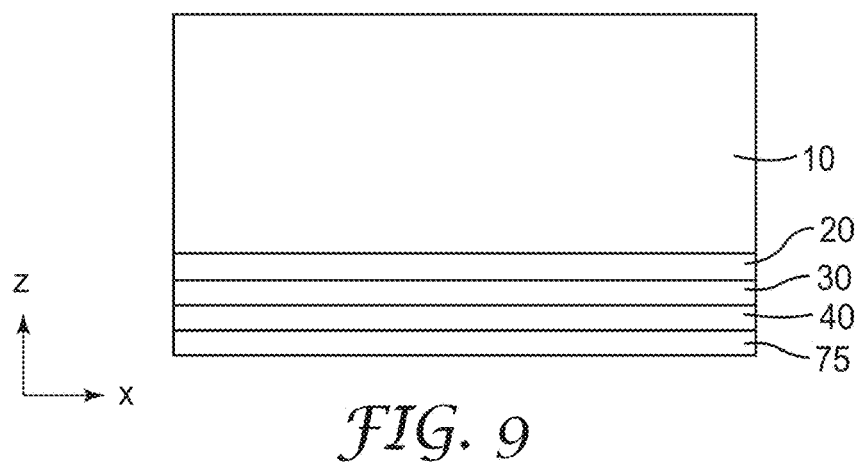
FIG. 9 is an x-z cross-sectional schematic view of the battery pack illustrated in FIG. 2 (the side plate 60 of the battery pack is not illustrated in FIG. 9).

According to some specific embodiments of the present invention, referring to FIG. 2 and FIG. 9, the battery pack at least includes: a first cell 10; a cured first curable pressure-sensitive adhesive composition layer 20 provided on at least part of an outer surface of the first cell 10, the first curable pressure-sensitive adhesive composition layer 20 including the curable pressure-sensitive adhesive composition provided by the present invention; a first electrical insulating layer 30, the first electrical insulating layer 30 being provided on one side of the cured first curable pressure-sensitive adhesive composition layer 20 away from the first cell 10; a cured second curable pressure-sensitive adhesive composition layer 40, the second curable pressure-sensitive adhesive composition layer 40 including the curable pressure-sensitive adhesive composition provided by the present invention, the cured second curable pressure-sensitive adhesive composition layer 40 being provided on one side of the first electrical insulating layer 30 away from the cured first curable pressure-sensitive adhesive composition layer 20; and a battery pack bottom plate 75 (not shown in FIG. 2), the battery pack bottom plate 75 being provided on one side of the cured second curable pressure-sensitive adhesive composition layer 40 away from the first electrical insulating layer 30. According to these specific embodiments, stable and firm bonding can be provided between the cell and the bottom plate of the battery pack, and electrical insulating layer protection can be provided between the cell and the bottom plate.

Figure 10:
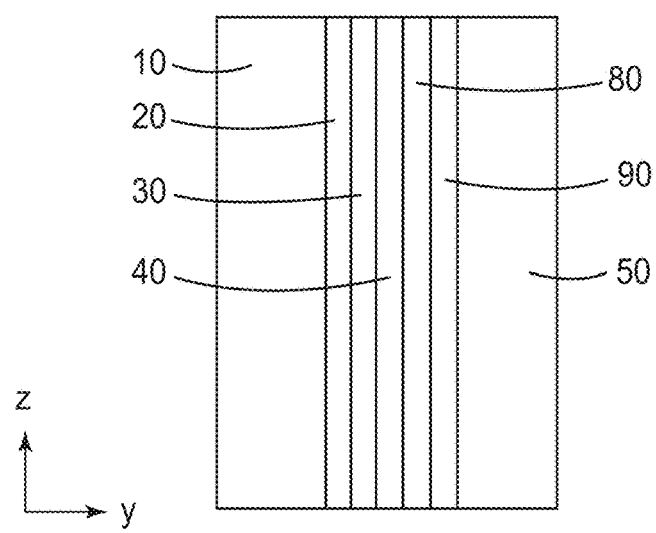
FIG. 10 is a y-z cross-sectional schematic view of the battery pack illustrated in FIG. 2 (the bottom plate 75 and the end plate 70 of the battery pack, and other cells except the first cell 10 and the second cell 20 are not illustrated in FIG. 10).

According to some specific embodiments of the present invention, referring to FIG. 2 and FIG. 10, the battery pack at least includes: a first cell 10; a cured first curable pressure-sensitive adhesive composition layer 20 provided on at least part of an outer surface of the first cell 10, the first curable pressure-sensitive adhesive composition layer 20 including the curable pressure-sensitive adhesive composition provided by the present invention; a first electrical insulating layer 30, the first electrical insulating layer 30 being provided on one side of the cured first curable pressure-sensitive adhesive composition layer 20 away from the first cell 10; a cured second curable pressure-sensitive adhesive composition layer 40, the second curable pressure-sensitive adhesive composition layer 40 including the curable pressure-sensitive adhesive composition provided by the present invention, the cured second curable pressure-sensitive adhesive composition layer 40 being provided on one side of the first electrical insulating layer 30 away from the cured first curable pressure-sensitive adhesive composition layer 20; a second electrical insulating layer 80, the second electrical insulating layer 80 being provided on one side of the cured second curable pressure-sensitive adhesive composition layer 40 away from the first electrical insulating layer 30; a cured third curable pressure-sensitive adhesive composition layer 90, the third curable pressure-sensitive adhesive composition layer 90 including the curable pressure-sensitive adhesive composition provided by the present invention, the cured third curable pressure-sensitive adhesive composition layer 90 being provided on one side of the second electrical insulating layer 80 away from the cured second curable pressure-sensitive adhesive composition layer 40; and a second cell 50, the second cell 50 being provided on one side of the cured third curable pressure-sensitive adhesive composition layer 90 away from the second electrical insulating layer 80. According to these specific embodiments, the cured curable pressure-sensitive adhesive composition layer provided by the present invention may be used to stably and firmly bond the two cells of the battery pack, and provide mutually independent electrical insulating layer protection between every two cells, thus further improving the stability and safety of the battery pack. Further, as required, according to the ideas provided in these specific embodiments, the cured curable pressure-sensitive adhesive composition layer provided by the present invention may be used to stably and firmly bond a plurality of cells of a battery pack, and provide mutually independent electrical insulating layer protection between every two cells.

The following specific embodiments are intended to describe the present invention exemplarily instead of restrictively.

Specific embodiment 1 is a UV induction curable pressure-sensitive adhesive composition, including: 30-65 parts of a reactive polyacrylate by weight; 30-50 parts of a liquid epoxy resin by weight; 5-20 parts of a solid epoxy resin by weight; 0.3-5 parts of a hydroxyl-containing compound by weight; and 0.02-3 parts of a photoinitiator by weight.

Specific embodiment 2 is the curable pressure-sensitive adhesive composition according to specific embodiment 1, in which the reactive polyacrylate is a polyacrylate with an epoxy group, a carboxyl group, or a hydroxyl group.

Specific embodiment 3 is the curable pressure-sensitive adhesive composition according to specific embodiment 1 or 2, in which the content of the reactive polyacrylate is 45-50 parts by weight.

Specific embodiment 4 is the curable pressure-sensitive adhesive composition according to any one of specific embodiments 1-3, in which the epoxy equivalent of the liquid epoxy resin is 176-330 g/eq, and the epoxy equivalent of the solid epoxy resin is 450-800 g/eq.

Specific embodiment 5 is the curable pressure-sensitive adhesive composition according to any one of specific embodiments 1-4, in which the content of the liquid epoxy resin is 30-40 parts by weight.

Specific embodiment 6 is the curable pressure-sensitive adhesive composition according to any one of specific embodiments 1-5, in which the content of the solid epoxy resin is 5-10 parts by weight.

Specific embodiment 7 is the curable pressure-sensitive adhesive composition according to any one of specific embodiments 1-6, in which the hydroxyl-containing compound is a polyol.

Specific embodiment 8 is the curable pressure-sensitive adhesive composition according to any one of specific embodiments 1-7, in which the content of the hydroxyl-containing compound is 1-3 parts by weight.

Specific embodiment 9 is the curable pressure-sensitive adhesive composition according to any one of specific embodiments 1-8, in which the content of the photoinitiator is 1-2 parts by weight.

Specific embodiment 10 is the curable pressure-sensitive adhesive composition according to any one of specific embodiments 1-9, in which the curable pressure-sensitive adhesive composition further includes 0.05-1 part of an epoxy silane coupling agent by weight. Specific embodiment 11 is the curable pressure-sensitive adhesive composition according to specific embodiment 1, in which the curable pressure-sensitive adhesive composition includes: 30-50 parts of the reactive polyacrylate by weight; 30-40 parts of the liquid epoxy resin by weight; 10-20 parts of the solid epoxy resin by weight; 1-3 parts of the hydroxyl-containing compound by weight; 1-2 parts of the photoinitiator by weight; and 0.05-1 part of an epoxy silane coupling agent by weight.

Specific embodiment 12 is a curable pressure-sensitive adhesive tape, including at least one curable pressure-sensitive adhesive composition layer, the curable pressure-sensitive adhesive composition layer including the curable pressure-sensitive adhesive composition according to any one of specific embodiments 1-11.

Specific embodiment 13 is the curable pressure-sensitive adhesive tape according to specific embodiment 12, in which the curable pressure-sensitive adhesive tape is a single-sided curable pressure-sensitive adhesive tape, and the single-sided curable pressure-sensitive adhesive tape includes an electrical insulating layer and the curable pressure-sensitive adhesive composition layer provided on one side of the electrical insulating layer.

Specific embodiment 14 is the curable pressure-sensitive adhesive tape according to specific embodiment 12, in which the curable pressure-sensitive adhesive tape is a double-sided curable pressure-sensitive adhesive tape, and the double-sided curable pressure-sensitive adhesive tape includes an electrical insulating layer and the curable pressure-sensitive adhesive composition layers respectively provided on two sides of the electrical insulating layer.

Specific embodiment 15 is the curable pressure-sensitive adhesive tape according to any one of specific embodiments 13 and 14, in which the electrical insulating layer includes a foam layer.

Specific embodiment 16 is the curable pressure-sensitive adhesive tape according to specific embodiment 15, in which the foam layer is a microporous polypropylene layer.

Specific embodiment 17 is a battery pack, which includes: a first cell; and a cured first curable pressure-sensitive adhesive composition layer provided on at least part of an outer surface of the first cell, the first curable pressure-sensitive adhesive composition layer including the curable pressure-sensitive adhesive composition according to any one of specific embodiments 1-12.

Specific embodiment 18 is the battery pack according to specific embodiment 17, in which the battery pack further includes a first electrical insulating layer, the first electrical insulating layer being provided on one side of the cured first curable pressure-sensitive adhesive composition layer away from the outer surface of the first cell.

Specific embodiment 19 is the battery pack according to specific embodiment 18, in which the battery pack further includes a cured second curable pressure-sensitive adhesive composition layer, the second curable pressure-sensitive adhesive composition layer including the curable pressure-sensitive adhesive composition according to any one of specific embodiments 1-11, the cured second curable pressure-sensitive adhesive composition layer is provided on one side of the first electrical insulating layer away from the first curable pressure-sensitive adhesive composition layer.

Specific embodiment 20 is the battery pack according to specific embodiment 19, in which the battery pack further includes a second cell, the second cell being provided on one side of the cured second curable pressure-sensitive adhesive composition layer away from the first electrical insulating layer.

Specific embodiment 21 is the battery pack according to specific embodiment 19, in which the battery pack further includes: a second electrical insulating layer; a cured third curable pressure-sensitive adhesive composition layer, the third curable pressure-sensitive adhesive composition layer including the curable pressure-sensitive adhesive composition according to any one of specific embodiments 1-11; and a second cell, where the second electrical insulating layer is provided on one side of the cured second curable pressure-sensitive adhesive composition layer away from the first electrical insulating layer; the cured third curable pressure-sensitive adhesive composition layer is provided on one side of the second electrical insulating layer away from the cured third curable pressure-sensitive adhesive composition layer; and the second cell is provided on one side of the cured third curable pressure-sensitive adhesive composition layer away from the second electrical insulating layer.

Specific embodiment 22 is the battery pack according to specific embodiment 19, in which the battery pack further includes a battery pack side plate, the battery pack side plate being provided on one side of the cured second curable pressure-sensitive adhesive composition layer away from the first electrical insulating layer.

Specific embodiment 23 is the battery pack according to specific embodiment 19, in which the battery pack further includes: a battery pack end plate, the battery pack end plate being provided on one side of the cured second curable pressure-sensitive adhesive composition layer away from the first electrical insulating layer.

Specific embodiment 24 is the battery pack according to example 19, in which the battery pack further includes a battery pack bottom plate, the battery pack bottom plate being provided on one side of the cured second curable pressure-sensitive adhesive composition layer away from the first electrical insulating layer.

EXAMPLES

The present invention will be further described below with examples. The examples and comparative examples provided below facilitate understanding of the present disclosure, and should not be construed as limiting the scope of the present disclosure.

Raw materials used in the examples and comparative examples are summarized in Table 1.

TABLE 1

| Model | Description | Supplier |
| --- | --- | --- |
| CSA 9005L | Reactive polyacrylate | 3M Corporation |
| EPOKUDKO YD-128 | Epoxy resin, with epoxy equivalent of approximately 187, liquid at room temperature and atmospheric pressure, standard liquid bisphenol A epoxy resin | Kukdo Chemical (Kunshan) Co., Ltd., Korea |
| NEPS-901 | Solid bisphenol epoxy resin, with epoxy equivalent of 450-500 | Taiwan Nanya Resin Co., Ltd. |
| KH560 | 3-oxpropyltrimethoxysilane as epoxy silane coupling agent | Nanjing Shuguang Chemical Group Co., Ltd. |
| VORANOL 2070 (V2070) | Polyol | Dow Chemical Company, U.S. |
| DOUBLECURE 1176 | Cationic photoinitiator as hexafluoroantimonate salt | Double Bond Chemical Ind., Co., Ltd. |
| B-125 PET film | Polyester film | Zhejiang Dahua Polyester Film Co., Ltd. |
| GLS-65 release paper | Release paper | Taibo New Materials Co., Ltd. |

Testing Method:

In the present invention, the following tests and evaluations were conducted on the samples obtained in the examples and comparative examples.

Peeling force tests were performed in accordance with ASTM D3330.

Shear strength tests were performed in accordance with GB/T 7124.

Pull strength tests were performed in accordance with ASTM D2095.

Bonding strength evaluation: If both the shear strength and the pull strength were less than 3 Mpa, the bonding strength was evaluated as poor; if both the shear strength and the pull strength were 3-4 MPa, the bonding strength was evaluated as good; if both the shear strength and the pull strength were greater than 4 MPa, the bonding strength was evaluated as excellent.

Anti-warping performance tests: For curable pressure-sensitive adhesive tapes, the following method was used to evaluate whether warping tended to occur in the curable pressure-sensitive adhesive tapes. A 10 mm-long curable pressure-sensitive adhesive tape was irradiated by UV light and then bonded to a surface of a square aluminum cell, one end of the pressure-sensitive adhesive tape was overlapped for 5 mm on a right-angle side (that is, one end of the pressure-sensitive adhesive tape with a length of 5 mm was bonded to the surface of the aluminum cell), and the other end was suspended in air. After curing at 25° C. for 24 hours, whether warping or bubbling occurred in the curable pressure-sensitive adhesive tape on the right-angle side of the cell was observed.

If warping occurred, the anti-warping performance was evaluated as poor; if bubbling but no warping occurred, the anti-warping performance was evaluated as good; if no change was observed, the anti-warping performance was evaluated as excellent.

Examples E1-E2, Comparative Examples C1-C3

UV induction curable pressure-sensitive adhesive compositions of Comparative Examples C1-C3 and Examples E1-E2 were prepared according to the weight ratios in Table 2.

TABLE 2

|  | C1 | C2 | C3 | E1 | E2 |
| --- | --- | --- | --- | --- | --- |
| CSA 9005L, parts by weight | 90 | 80 | 50 | 50 | 50 |
| YD 128, parts by weight | 10 | 20 | 50 | 40 | 40 |
| NEPS901, parts by weight | — | — | — | 10 | 10 |
| KH560, parts by weight | — | — | — | — | 0.1 |
| V2070, parts by weight | 1 | 1 | 1 | 1 | 1 |
| 1176, parts by weight | 1 | 1 | 1 | 1 | 1 |

Method for Preparing Curable Pressure-Sensitive Adhesive Tape:

Each component of a curable pressure-sensitive adhesive composition was weighed and added into a flask. A proper amount of a mixed solvent (weight ratio 3:1) of ethyl acetate and acetone was added to adjust the viscosity. The mixture was stirred and mixed uniformly with a pneumatic stirrer.

After standing to remove bubbles, the curable pressure-sensitive adhesive composition solution was coated on a PET film by using a comma roll coater.

After the solvent was dried in an oven, a UV induction curable pressure-sensitive adhesive tape was obtained.

In Comparative Examples C1 and C2, the contents of the reactive polyacrylate and the epoxy resins were not within the content ranges in the curable pressure-sensitive adhesive composition provided by the present invention, the epoxy resins were both liquid epoxy resins, and no epoxy silane coupling agent was included.

In Comparative Example C3, the contents of the reactive polyacrylate and the liquid epoxy resin were within the content ranges in the curable pressure-sensitive adhesive composition provided by the present invention, but no solid epoxy resin or epoxy silane coupling agent was included.

In Example E1, the contents of the reactive polyacrylate, the liquid epoxy resin, and the solid epoxy resin were within the content ranges in the curable pressure-sensitive adhesive composition provided by the present invention, but no epoxy silane coupling agent was included.

In Example 2, the content of each component was within the content range in the curable pressure-sensitive adhesive composition provided by the present invention, and an appropriate amount of an epoxy silane coupling agent was further included.

Performance tests were performed on the curable pressure-sensitive adhesive compositions provided by Comparative Examples C1-C3 and Examples E1-E2. The test results are listed in Table 3.

Peeling force test A: A UV light source of 100 mW/cm$^2$ was used to respectively induce the curable pressure-sensitive adhesive tape in each example and comparative example for 10 seconds, and the accumulated UV irradiation energy was 1000 mJ/cm$^2$. The curable pressure-sensitive adhesive tape was bonded to an aluminum plate at room temperature of 25° C. After curing for 3 days, the peeling force A of the obtained curable pressure-sensitive adhesive tape was tested in accordance with ASTM D3330.

Peeling force test B: A UV light source of 100 mW/cm$^2$ was used to respectively induce the curable pressure-sensitive adhesive tape in each example and comparative example for 20 seconds, and the accumulated UV irradiation energy was 2000 mJ/cm$^2$. The curable pressure-sensitive adhesive tape was bonded to an aluminum plate at room temperature of 25° C. After curing for 3 days, the peeling force B of the obtained curable pressure-sensitive adhesive tape was tested in accordance with ASTM D3330.

Peeling force test C: A UV light source of 100 mW/cm$^2$ was used to respectively induce the curable pressure-sensitive adhesive tape in each example and comparative example for 50 seconds, and the accumulated UV irradiation energy was 5000 mJ/cm$^2$. The curable pressure-sensitive adhesive tape was bonded to an aluminum plate at room temperature of 25° C. After curing for 3 days, the peeling force C of the obtained curable pressure-sensitive adhesive tape was tested in accordance with ASTM D3330.

It needs to be noted that, for peeling force tests, peeling force test results obtained after rapid curing of a curable pressure-sensitive adhesive tape at 80° C. for 30 minutes were higher than peeling force test results obtained after curing at room temperature for several days. In order to compare the peeling force of each curable pressure-sensitive adhesive tape under actual use conditions, the peeling force was evaluated by adopting curing at room temperature instead of rapid curing at 80° C. for 30 minutes.

Shear strength and pull strength tests: A UV light source of 100 mW/cm$^2$ was used to respectively induce the curable pressure-sensitive adhesive tape in each example and comparative example for 10 seconds, and the accumulated UV irradiation energy was 1000 mJ/cm$^2$. After the curable pressure-sensitive adhesive tape was cured rapidly at 80° C. for 30 minutes, the shear strength of the obtained pressure-sensitive adhesive was tested in accordance with GB/T 7124, and the pull strength of the obtained pressure-sensitive adhesive was tested in accordance with ASTM D2095. It needs be noted that, for shear strength and pull strength tests, test results obtained after curing of a curable pressure-sensitive adhesive tape at room temperature for 3 days were similar to test results obtained after rapid curing at 80° C. for 30 minutes. Therefore, the test results obtained after rapid curing at 80° C. for 30 minutes may be used to evaluate the shear strength and pull strength, so as to reduce the test time.

Anti-warping performance tests: The curable pressure-sensitive adhesive tape provided by each example and comparative example was tested and evaluated according to the anti-warping performance test method described above. A UV light source of 100 mW/cm$^2$ was used to respectively induce the curable pressure-sensitive adhesive tape in each example and comparative example for 10 seconds, and the accumulated UV irradiation energy was 1000 mJ/cm$^2$. After being irradiated by UV light, the cured pressure-sensitive adhesive tapes provided by the examples and comparative examples were stood at room temperature for 24 hours, and the test results were observed.

The bonding strength of the curable pressure-sensitive adhesive tapes provided by the examples and comparative examples was evaluated according to the method described above. The UV window was evaluated by comparing the peeling force A and the peeling force B. When the peeling force B measured under the energy of 2000 mJ/cm$^2$ was not less than 50% of the peeling force A measured under the energy of 1000 mJ/cm$^2$, it was considered that the energy of 2000 mJ/cm$^2$ was still in a feasible UV window, and the UV window was evaluated as wide; when the peeling force B measured under the energy of 2000 mJ/cm$^2$ was between 15% and 50% of the peeling force A measured under the energy of 1000 mJ/cm$^2$, the UV window was relatively wide; when the peeling force A measured under the energy of 2000 mJ/cm$^2$ was less than 15% of the peeling force A measured at 1000 mJ/cm$^2$, the UV window was evaluated as narrow.

The test results are listed in Table 3.

TABLE 3

|  | C1 | C2 | C3 | E1 | E2 |
|---|---|---|---|---|---|
| Peeling force A, N/mm (1000 mJ/cm$^2$, room temperature, 72 hours) | 1.5 | 1.3 | 0.7 | 0.7 | 0.7 |
| Peeling force B, N/mm (2000 mJ/cm$^2$, room temperature, 72 hours) | 1.5 | 0.8 | 0.1 | 0.1 | 0.6 |
| Shear strength, MPa | 1.17 | 2.89 | 5.2 | 5.3 | 5.3 |
| Pull strength, MPa | 1.05 | 2.18 | 5.4 | 5.4 | 5.4 |
| Anti-warping performance | Excellent | Excellent | Poor | Excellent | Excellent |
| Bonding strength | Poor | Poor | Excellent | Excellent | Excellent |
| UV window | Wide | Wide | Narrow | Narrow | Wide |

From the peeling force test results in Table 3, it can be seen that the curable pressure-sensitive adhesive composition provided by Example E1 was induced to cure under the UV irradiation energy of 2000 mJ/cm$^2$, and the peeling force of the obtained insulating pressure-sensitive adhesive layer significantly decreased relative to that in the condition of 1000 mJ/cm$^2$. This indicates that the peeling force of the insulating pressure-sensitive adhesive layer is sensitive to UV irradiation energy when the content of the epoxy resin is high. Therefore, in order to prevent the peeling force of the insulating pressure-sensitive adhesive layer from decreasing significantly, the UV irradiation energy needs to be limited in a narrow UV energy process window. The narrow UV energy process window has more strict requirements on conditions of the induced curing process, and has higher equipment requirements and lower fault tolerance.

By contrast, the curable pressure-sensitive adhesive composition provided by Example E2 was induced to cure under the UV irradiation energy of 2000 mJ/cm$^2$, and the peeling force of the obtained insulating pressure-sensitive adhesive layer substantially did not decrease relative to the peeling force of the obtained insulating pressure-sensitive adhesive layer under the UV irradiation energy of 1000 mJ/cm². In particular, compared with Example E1, in which the other components are the same but no epoxy silane coupling agent is included, the peeling force is much larger.

It can be seen that the composition of the curable pressure-sensitive adhesive composition provided by the present invention can provide both good bonding strength and good anti-warping performance. In addition, if the curable pressure-sensitive adhesive composition provided by the present invention further includes an appropriate amount of an epoxy silane coupling agent, a wider UV energy process window can be further obtained.

Examples E3-E8

Examples E3-E8 were implemented by adopting the same methods as those in Example E1. The difference lay in the components and the contents in the compositions. The compositions and test results of Examples E3-E8 of the present invention are listed in Table 4.

TABLE 4

|  | E3 | E4 | E5 | E6 | E7 | E8 |
| --- | --- | --- | --- | --- | --- | --- |
| CSA 9005L, parts by weight | 65 | 30 | 50 | 50 | 50 | 50 |
| YD 128, parts by weight | 30 | 50 | 40 | 40 | 40 | 40 |
| NEPS901, parts by weight | 5 | 20 | 10 | 10 | 10 | 10 |
| KH560, parts by weight | 0.1 | 0.1 | 0.05 | 1 | 0.1 | 0.1 |
| V2070, parts by weight | 1 | 1 | 1 | 1 | 3 | 1 |
| 1176, parts by weight | 1 | 1 | 1 | 1 | 1 | 2 |
| Peeling force A, N/mm (1000 mJ/cm², room temperature, 72 hrs.) | 0.9 | 0.3 | 0.7 | 0.8 | 0.8 | 0.6 |
| Peeling force B, N/mm (2000 mJ/cm², room temperature, 72 hrs.) | 0.7 | 0.05 | 0.4 | 0.7 | 0.6 | 0.4 |
| Shear strength, MPa | 3.5 | 6.8 | 5.3 | 4.9 | 4.8 | 5.6 |
| Pull strength, MPa | 3.7 | 7.0 | 5.3 | 5.0 | 4.9 | 5.7 |
| Anti-warping performance | Excellent | Excellent | Excellent | Excellent | Excellent | Excellent |
| Bonding strength | Good | Excellent | Excellent | Excellent | Excellent | Excellent |
| UV window | Wide | Relatively wide | Wide | Wide | Wide | Wide |

According to Table 4, the insulating pressure-sensitive adhesive provided by the present invention can provide at least good bonding strength, good anti-warping performance, and a relatively wide UV energy process window.

According to Table 2, Table 3, and Table 4, when the content of the reactive polyacrylate in the curable pressure-sensitive adhesive composition is 30-50 parts by weight, the corresponding insulating pressure-sensitive adhesive has excellent bonding strength and excellent anti-warping performance.

According to Table 2, Table 3, and Table 4, when the content of the liquid epoxy resin in the curable pressure-sensitive adhesive composition is 40-50 parts by weight, the corresponding insulating pressure-sensitive adhesive has excellent bonding strength and excellent anti-warping performance.

According to Table 2, Table 3, and Table 4, when the content of the solid epoxy resin in the curable pressure-sensitive adhesive composition is 10-20 parts by weight, the corresponding insulating pressure-sensitive adhesive has excellent bonding strength and excellent anti-warping performance.

According to Table 2, Table 3, and Table 4, when the content of the epoxy silane coupling agent in the curable pressure-sensitive adhesive composition is 0.05-1 part by weight, the corresponding insulating pressure-sensitive adhesive has a relatively wide UV energy process window.

According to Table 2, Table 3, and Table 4, when the curable pressure-sensitive adhesive composition includes 30-50 parts of a reactive polyacrylate by weight, 30-40 parts of a liquid epoxy resin by weight, 10-20 parts of a solid epoxy resin by weight, 0.05-1 part of an epoxy silane coupling agent by weight, 1-3 parts of a hydroxyl-containing compound by weight, and 1-2 parts of a photoinitiator by weight, the corresponding insulating pressure-sensitive adhesive has excellent bonding strength, excellent anti-warping performance, and a wide UV energy process window.

Example E8 and Example E9

Example E8 and Example E9 were implemented by adopting the same methods as those in Example E3 and Example E7. The difference lay in that the curable pressure-sensitive adhesive compositions in Example E8 and Example E9 were irradiated by UV light of 5000 mJ/cm², and the peeling force C after curing at room temperature of 25° C. for 3 days was tested. The compositions and test results of Example E8 and Example E9 of the present invention are listed in Table 5.

TABLE 5

|  | E8 | E9 |
| --- | --- | --- |
| CSA 9005L, parts by weight | 65 | 50 |
| YD 128, parts by weight | 30 | 40 |
| NEPS901, parts by weight | 5 | 10 |
| KH560, parts by weight | 0.1 | 0.1 |
| V2070, parts by weight | 1 | 3 |
| 1176, parts by weight | 1 | 1 |
| Peeling force C, N/mm (5000 mJ/cm², room temperature, 72 hrs.) | 0.4 | 0.25 |
| Shear strength, MPa | 3.6 | 5.2 |
| Pull strength, MPa | 3.6 | 5.2 |
| Anti-warping performance | Excellent | Excellent |
| Bonding strength | Good | Excellent |
| UV window | Wide | Wide |

According to Table 5, the peeling force results of E8 and E9 were respectively 0.4 N/mm and 0.25 N/mm under the UV irradiation energy of 5000 mJ/cm².

By contrast, the peeling force results of E3 and E7 were 0.9 N/mm and 0.8 N/mm under the UV irradiation energy of 1000 mJ/cm².

This indicates that the peeling force of the curable pressure-sensitive adhesive tape provided by the present invention is still high even under the energy condition of 5000 mJ/cm$^2$, and is not less than 30% of the peeling force under the energy condition of 1000 mJ/cm$^2$.

Accordingly, it can be seen that, by further adding the epoxy silane coupling agent into the curable pressure-sensitive adhesive composition system provided by the present invention, a relatively wide UV energy process window can be obtained.

Example E10

The curable pressure-sensitive adhesive tape was prepared by adopting the same method as that in Example 1, and adopting the raw materials and contents in Table 6.

TABLE 6

| Raw Materials | Description | Supplier | Parts by weight |
|---|---|---|---|
| CSA 9005L | Reactive polyacrylate | 3M Corporation | 50 |
| YD 128 | Liquid epoxy resin | Kukdo Chemical (Kunshan) Co., Ltd., Korea | 40 |
| NEPS 901 | Solid epoxy resin | Taiwan Nanya Resin Co., Ltd. | 10 |
| Double cure 1176 | Cationic photoinitiator | Double Bond Chemical Ind., Co., Ltd. | 1 |
| V2070 | Polyol | Dow Chemical, U.S. | 4 |
| Porous polypropylene MPP | 1 mm-thick polypropylene foam | Tenbond New Materials Co., Ltd. | — |
| GLS-65 release paper | Release paper | Taibo New Materials Co., Ltd. | — |

Porous polypropylene MMP (or other applicable electrical insulating foam layers) was used as a substrate layer to prepare a double-sided adhesive tape with release paper on two sides by the following steps:

Each component of a curable pressure-sensitive adhesive composition was weighed and added into a flask. A proper amount of a mixed solvent (weight ratio 3:1) of ethyl acetate and acetone was added for adjustment. The mixture was stirred and mixed uniformly with a pneumatic stirrer to obtain a curable pressure-sensitive adhesive composition solution.

The curable pressure-sensitive adhesive composition solution was coated on release paper by using a comma roll. The coated release paper was placed in an oven and heated at 110° C. for 10 minutes to remove the solvent, so as to obtain a single-sided coated adhesive tape.

Then, the adhesive tapes were laminated on two sides of the porous polypropylene layer MMP (or other applicable insulating foam layers) to obtain a double-sided pressure-sensitive foam adhesive tape.

In this example, the release paper on the first side of the double-sided pressure-sensitive foam adhesive tape may be removed firstly, then the first pressure-sensitive adhesive layer was exposed to a 365 nm LED UV light source, and when the accumulated irradiation energy reached 1000 mJ/cm$^2$, a crosslinking curing reaction of the adhesive was initiated. Then, the first pressure-sensitive adhesive layer in which the reaction had been initiated was bonded to a surface of one cell of a battery pack. The release paper on the second side of the double-sided pressure-sensitive foam adhesive tape was removed, the second pressure-sensitive adhesive layer was exposed to a 365 nm LED UV light source, and when the accumulated irradiation energy reached 1000 mJ/cm$^2$, a crosslinking curing reaction of the adhesive was initiated. Then, a surface of another cell of the battery pack was bonded to the exposed second pressure-sensitive adhesive layer.

After the crosslinking curing reactions of the first pressure-sensitive adhesive layer and the second pressure-sensitive adhesive layer were completed, a battery pack was obtained.

Referring to FIG. 2 and FIG. 6, the battery pack includes:

a first cell 10;

a cured first curable pressure-sensitive adhesive composition layer 20 provided on at least part of an outer surface of the first cell 10, the first curable pressure-sensitive adhesive composition layer 20 including the curable pressure-sensitive adhesive composition provided according to this example;

a first electrical insulating layer (porous polypropylene MMP) 30, the first electrical insulating layer 30 being provided on one side of the cured first curable pressure-sensitive adhesive composition layer 20 away from the first cell 10;

a cured second curable pressure-sensitive adhesive composition layer 40, the second curable pressure-sensitive adhesive composition layer 40 including the curable pressure-sensitive adhesive composition provided according to this example, the cured second curable pressure-sensitive adhesive composition layer 40 being provided on one side of the first electrical insulating layer 30 away from the cured first curable pressure-sensitive adhesive composition layer 20; and a second cell 50, the second cell 50 being provided on one side of the cured second curable pressure-sensitive adhesive composition layer 40 away from the first electrical insulating layer 30.

Accordingly, it can be seen that, in the battery pack provided by this example, the double-sided curable pressure-sensitive adhesive tape provided by this example can stably and firmly bond the two cells of the battery pack together, and provide electrical insulating layer protection between the two cells.

In addition, since the first electrical insulating layer of the double-sided curable pressure-sensitive adhesive tape provided by this example is a foam layer, the double-sided curable pressure-sensitive adhesive tape not only can provide high bonding strength, but also can adapt to assembly mechanical tolerance, thus further improving the safety of the battery pack.

Example E11

This example used the same double-sided curable pressure-sensitive adhesive tape as that in Example E10.

In this example, the release paper on the first side of the double-sided pressure-sensitive foam adhesive tape may be removed firstly, then the first pressure-sensitive adhesive layer was exposed to a 365 nm LED UV light source, and when the accumulated irradiation energy reached 1000 mJ/cm$^2$, a crosslinking curing reaction of the adhesive was initiated. Then, the first pressure-sensitive adhesive layer in which the reaction had been initiated was bonded to a surface of one cell of a battery pack. The release paper on the second side of the double-sided pressure-sensitive foam adhesive tape was removed, the second pressure-sensitive adhesive layer was exposed to a 365 nm LED UV light source, and when the accumulated irradiation energy reached 1000 mJ/cm$^2$, a crosslinking curing reaction of the adhesive was initiated. Then, one side plate of the battery pack was bonded to the exposed second pressure-sensitive adhesive layer.

After the crosslinking curing reactions of the first pressure-sensitive adhesive layer and the second pressure-sensitive adhesive layer were completed, a battery pack was obtained. Referring to FIG. 2 and FIG. 7, the battery pack includes:
- a first cell 10;
- a cured first curable pressure-sensitive adhesive composition layer 20 provided on at least part of an outer surface of the first cell 10, the first curable pressure-sensitive adhesive composition layer 20 including the curable pressure-sensitive adhesive composition provided according to this example;
- a first electrical insulating layer (porous polypropylene MMP) 30, the first electrical insulating layer 30 being provided on one side of the cured first curable pressure-sensitive adhesive composition layer 20 away from the first cell 10;
- a cured second curable pressure-sensitive adhesive composition layer 40, the second curable pressure-sensitive adhesive composition layer 40 including the curable pressure-sensitive adhesive composition provided according to this example, the cured second curable pressure-sensitive adhesive composition layer 40 being provided on one side of the first electrical insulating layer 30 away from the cured first curable pressure-sensitive adhesive composition layer 20; and
- a battery pack side plate 60, the battery pack side plate 60 being provided on one side of the cured second curable pressure-sensitive adhesive composition layer 40 away from the first electrical insulating layer 30.

Accordingly, it can be seen that, in the battery pack provided by this example, the double-sided curable pressure-sensitive adhesive tape provided by this example can stably and firmly bond one cell and one side plate of the battery pack together, and provide electrical insulating layer protection between the cell and the side plate.

In addition, since the first electrical insulating layer of the double-sided curable pressure-sensitive adhesive tape provided by this example is a foam layer, the double-sided curable pressure-sensitive adhesive tape not only can provide high bonding strength, but also can adapt to assembly mechanical tolerance, thus further improving the safety of the battery pack.

Example E12

This example used the same double-sided pressure-sensitive foam adhesive tape as that in Example E10.

In this example, the release paper on the first side of the double-sided pressure-sensitive foam adhesive tape may be removed firstly, then the first pressure-sensitive adhesive layer was exposed to a 365 nm LED UV light source, and when the accumulated irradiation energy reached 1000 mJ/cm$^2$, a crosslinking curing reaction of the adhesive was initiated. Then, the first pressure-sensitive adhesive layer in which the reaction had been initiated was bonded to a surface of one cell of a battery pack. The release paper on the second side of the double-sided pressure-sensitive foam adhesive tape was removed, the second pressure-sensitive adhesive layer was exposed to a 365 nm LED light source, and when the accumulated irradiation energy reached 1000 mJ/cm$^2$, a crosslinking curing reaction of the adhesive was initiated. Then, one end plate of the battery pack was bonded to the exposed second pressure-sensitive adhesive layer.

After the crosslinking curing reactions of the first pressure-sensitive adhesive layer and the second pressure-sensitive adhesive layer were completed, a battery pack was obtained. Referring to FIG. 2 and FIG. 8, the battery pack includes:
- a first cell 10;
- a cured first curable pressure-sensitive adhesive composition layer 20 provided on at least part of an outer surface of the first cell 10, the first curable pressure-sensitive adhesive composition layer 20 including the curable pressure-sensitive adhesive composition provided according to this example;
- a first electrical insulating layer (porous polypropylene MMP) 30, the first electrical insulating layer 30 being provided on one side of the cured first curable pressure-sensitive adhesive composition layer 20 away from the first cell 10;
- a cured second curable pressure-sensitive adhesive composition layer 40, the second curable pressure-sensitive adhesive composition layer 40 including the curable pressure-sensitive adhesive composition provided according to this example, the cured second curable pressure-sensitive adhesive composition layer 40 being provided on one side of the first electrical insulating layer 30 away from the cured first curable pressure-sensitive adhesive composition layer 20; and
- a battery pack end plate 70, the battery pack end plate 70 being provided on one side of the cured second curable pressure-sensitive adhesive composition layer 40 away from the first electrical insulating layer 30.

Accordingly, it can be seen that, in the battery pack provided by this example, the double-sided curable pressure-sensitive adhesive tape provided by this example can stably and firmly bond one cell and one end plate of the battery pack together, and provide electrical insulating layer protection between the cell and the end plate.

In addition, since the first electrical insulating layer of the double-sided curable pressure-sensitive adhesive tape provided by this example is a foam layer, the double-sided curable pressure-sensitive adhesive tape not only can provide high bonding strength, but also can adapt to assembly mechanical tolerance, thus further improving the safety of the battery pack.

Example E13

This example used the same double-sided pressure-sensitive foam adhesive tape as that in Example E10.

In this example, the release paper on the first side of the double-sided pressure-sensitive foam adhesive tape may be removed firstly, then the first pressure-sensitive adhesive layer was exposed to a 365 nm LED UV light source, and when the accumulated irradiation energy reached 1000 mJ/cm², a crosslinking curing reaction of the adhesive was initiated. Then, the first pressure-sensitive adhesive layer in which the reaction had been initiated was bonded to a surface of one cell of a battery pack. The release paper on the second side of the double-sided pressure-sensitive foam adhesive tape was removed, the second pressure-sensitive adhesive layer was exposed to a 365 nm LED light source, and when the accumulated irradiation energy reached 1000 mJ/cm², a crosslinking curing reaction of the adhesive was initiated. Then, one bottom plate of the battery pack was bonded to the exposed second pressure-sensitive adhesive layer.

After the crosslinking curing reactions of the first pressure-sensitive adhesive layer and the second pressure-sensitive adhesive layer were completed, a battery pack was obtained. Referring to FIG. 2 and FIG. 9, the battery pack includes:
- a first cell 10;
- a cured first curable pressure-sensitive adhesive composition layer 20 provided on at least part of an outer surface of the first cell 10, the first curable pressure-sensitive adhesive composition layer 20 including the curable pressure-sensitive adhesive composition provided according to this example;
- a first electrical insulating layer (porous polypropylene MMP) 30, the first electrical insulating layer 30 being provided on one side of the cured first curable pressure-sensitive adhesive composition layer 20 away from the first cell 10;
- a cured second curable pressure-sensitive adhesive composition layer 40, the second curable pressure-sensitive adhesive composition layer 40 including the curable pressure-sensitive adhesive composition provided according to this example, the cured second curable pressure-sensitive adhesive composition layer 40 being provided on one side of the first electrical insulating layer 30 away from the cured first curable pressure-sensitive adhesive composition layer 20; and
- a battery pack bottom plate 75 (not shown in FIG. 2), the battery pack bottom plate 75 being provided on one side of the cured second curable pressure-sensitive adhesive composition layer 40 away from the first electrical insulating layer 30.

Accordingly, it can be seen that, in the battery pack provided by this example, the double-sided curable pressure-sensitive adhesive tape provided by this example can stably and firmly bond one cell and one bottom plate of the battery pack together, and provide electrical insulating layer protection between the cell and the bottom plate.

In addition, since the first electrical insulating layer of the double-sided curable pressure-sensitive adhesive tape provided by this example is a foam layer, the double-sided curable pressure-sensitive adhesive tape not only can provide high bonding strength, but also can adapt to assembly mechanical tolerance, thus further improving the safety of the battery pack.

Obviously, the above examples of the present invention are only examples used for clearly describing the present invention, instead of limiting the implementation of the present invention. One skilled in the art may make other forms of changes or variations on the basis of the above description. It is impossible to exhaust all the implementations herein. All obvious changes or variations derived from the technical solution of the present invention are still within the protection scope of the present invention.

What is claimed is:

1. A curable pressure-sensitive adhesive composition, comprising:
   30-65 parts of a reactive polyacrylate by weight, wherein the reactive polyacrylate has epoxy groups, carboxyl groups, or hydroxyl groups, and based on the total weight of 100% polyacrylate, the proportion of monomers with epoxy groups, hydroxyl groups, or carboxyl groups is 1.5-30% by weight;
   30-40 parts of a liquid epoxy resin by weight;
   10-20 parts of a solid epoxy resin by weight;
   0.3-5 parts of a hydroxyl-containing compound by weight; and
   0.02-3 parts of a photoinitiator by weight, wherein the epoxy equivalent of the liquid epoxy resin is 176-330 g/eq, and the epoxy equivalent of the solid epoxy resin is 450-800 g/eq.

2. The curable pressure-sensitive adhesive composition according to claim 1, wherein the reactive polyacrylate is a polyacrylate with an epoxy group, a carboxyl group, or a hydroxyl group.

3. The curable pressure-sensitive adhesive composition according to claim 1, wherein the content of the reactive polyacrylate is 30-50 parts by weight.

4. The curable pressure-sensitive adhesive composition according to claim 1, wherein the liquid epoxy resin is present in an amount of 30-40 parts by weight.

5. The curable pressure-sensitive adhesive composition according to claim 1, wherein the solid epoxy resin is present in an amount of 10-20 parts by weight.

6. The curable pressure-sensitive adhesive composition according to claim 1, wherein the hydroxyl-containing compound is a polyol.

7. The curable pressure-sensitive adhesive composition according to claim 1, wherein the hydroxyl-containing compound is present in an amount of 1-3 parts by weight.

8. The curable pressure-sensitive adhesive composition according to claim 1, wherein the photoinitiator is present in an amount of 1-2 parts by weight.

9. The curable pressure-sensitive adhesive composition according to claim 1, further comprising an epoxy silane coupling agent present in an amount of 0.05-1 parts by weight.

10. The curable pressure-sensitive adhesive composition according to claim 1, comprising:
    30-50 parts of the reactive polyacrylate by weight;
    30-40 parts of the liquid epoxy resin by weight;
    10-20 parts of the solid epoxy resin by weight;
    1-3 parts of the hydroxyl-containing compound by weight;
    1-2 parts of the photoinitiator by weight; and
    0.05-1 part of an epoxy silane coupling agent by weight.

\* \* \* \* \*